(12) United States Patent
Hakura et al.

(10) Patent No.: US 9,836,878 B2
(45) Date of Patent: Dec. 5, 2017

(54) SYSTEM, METHOD, AND COMPUTER PROGRAM PRODUCT FOR PROCESSING PRIMITIVE SPECIFIC ATTRIBUTES GENERATED BY A FAST GEOMETRY SHADER

(71) Applicant: NVIDIA Corporation, Santa Clara, CA (US)

(72) Inventors: Ziyad Sami Hakura, San Jose, CA (US); Peter Nelson, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 196 days.

(21) Appl. No.: 14/820,438

(22) Filed: Aug. 6, 2015

(65) Prior Publication Data

US 2015/0348317 A1    Dec. 3, 2015

Related U.S. Application Data

(63) Continuation-in-part of application No. 13/843,916, filed on Mar. 15, 2013, now Pat. No. 9,269,179.

(60) Provisional application No. 62/035,353, filed on Aug. 8, 2014.

(51) Int. Cl.
  *G06T 15/80* (2011.01)
  *G06T 15/87* (2011.01)
  *G06T 15/00* (2011.01)

(52) U.S. Cl.
  CPC ............ *G06T 15/87* (2013.01); *G06T 15/005* (2013.01); *G06T 15/80* (2013.01); *G06T 2200/04* (2013.01); *G06T 2200/28* (2013.01)

(58) Field of Classification Search
  None
  See application file for complete search history.

(56) References Cited

U.S. PATENT DOCUMENTS

| 8,006,236 B1 * | 8/2011 | Kilgard ................... G06F 8/443 345/419 |
| 2011/0080406 A1 * | 4/2011 | Hakura ................... G06T 15/50 345/426 |

(Continued)

OTHER PUBLICATIONS

Segal et al., "The OpenGL Graphics System: A Specification (Version 3.2(Core Profile))," Dec. 7, The Khronos Group Inc., 2009.*

*Primary Examiner* — Nicholas R Wilson
(74) *Attorney, Agent, or Firm* — Zilka-Kotab, PC

(57) ABSTRACT

A system, method, and computer program product are provided for processing primitive-specific attributes. A portion of a graphics processor is determined to operate in a fast geometry shader mode and a vertex associated with a set of per-vertex attributes is determined to be a shared vertex. The shared vertex is determined to be a non-provoking vertex corresponding to a first primitive that is associated with a first set of per-primitive attributes and the shared vertex is determined to be a provoking vertex corresponding to a second primitive that is associated with a second set of per-primitive attributes. Only one set of the per-vertex attributes associated with the shared vertex is stored and only one of the second set of per-primitive attributes associated with the second primitive is stored.

15 Claims, 16 Drawing Sheets

| | Input Stream | | Output Stream | |
|---|---|---|---|---|
| Primitive A | Vertex 506 | Provoking | Vertex | Primitive A |
| | Vertex 507 | Non-Provoking | Vertex | |
| | Vertex 508 | Non-Provoking | Vertex | |
| Primitive B | Vertex 507 | Provoking | | Primitive B |
| | Vertex 509 | Non-Provoking | Vertex | |
| | Vertex 508 | Non-Provoking | | |
| Primitive C | Vertex 508 | Provoking | | Primitive C |
| | Vertex 509 | Non-Provoking | | |
| | Vertex 510 | Non-Provoking | Vertex | |

(56) References Cited

U.S. PATENT DOCUMENTS

2012/0223947 A1* 9/2012 Nystad ............... G06T 15/005
                                                      345/426
2014/0267260 A1  9/2014 Hakura et al.
2014/0267276 A1  9/2014 Hakura et al.

* cited by examiner

| | Input Stream | | Output Stream | |
|---|---|---|---|---|
| Primitive A | Vertex 506 | Provoking | Vertex | Primitive A |
| | Vertex 507 | Non-Provoking | Vertex | |
| | Vertex 508 | Non-Provoking | Vertex | |
| Primitive B | Vertex 507 | Provoking | | Primitive B |
| | Vertex 509 | Non-Provoking | Vertex | |
| | Vertex 508 | Non-Provoking | | |
| Primitive C | Vertex 508 | Provoking | | Primitive C |
| | Vertex 509 | Non-Provoking | | |
| | Vertex 510 | Non-Provoking | Vertex | |

| Input Stream | | | Output Stream | |
|---|---|---|---|---|
| Primitive A | Vertex 566 | Provoking | Vertex | Primitive A |
| | Vertex 567 | Non-Provoking | Vertex | |
| | Vertex 568 | Non-Provoking | Vertex | |
| Primitive B | Vertex 566 | Provoking | Vertex Copy | Primitive B |
| | Vertex 568 | Non-Provoking | | |
| | Vertex 569 | Non-Provoking | Vertex | |
| Primitive C | Vertex 566 | Provoking | Vertex Copy | Primitive C |
| | Vertex 569 | Non-Provoking | | |
| | Vertex 570 | Non-Provoking | Vertex | |

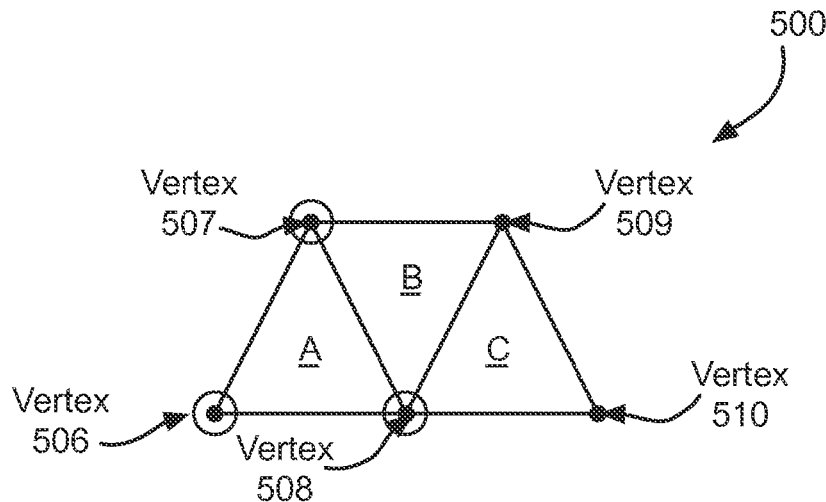

*Fig. 6A*

| | Input Stream | | Output Stream | |
|---|---|---|---|---|
| Primitive A | Vertex 506<br>Vertex 507<br>Vertex 508 | Provoking<br>Non-Provoking<br>Non-Provoking | Vertex<br>Vertex<br>Vertex | Primitive A<br>Primitive B<br>Primitive C |
| Primitive B | Vertex 507<br>Vertex 509<br>Vertex 508 | Provoking<br>Non-Provoking<br>Non-Provoking | Vertex | |
| Primitive C | Vertex 508<br>Vertex 509<br>Vertex 510 | Provoking<br>Non-Provoking<br>Non-Provoking | Vertex | |

*Fig. 6B*

| Input Stream | | | Output Stream | |
|---|---|---|---|---|
| Primitive A | Vertex 566 | Provoking | Vertex | Primitive A |
| | Vertex 567 | Non-Provoking | Vertex | |
| | Vertex 568 | Non-Provoking | Vertex | |
| Primitive B | Vertex 566 | Provoking | Vertex Copy | Primitive B |
| | Vertex 568 | Non-Provoking | | |
| | Vertex 569 | Non-Provoking | Vertex | |
| Primitive C | Vertex 566 | Provoking | Vertex Copy | Primitive C |
| | Vertex 569 | Non-Provoking | | |
| | Vertex 570 | Non-Provoking | Vertex | |

SYSTEM, METHOD, AND COMPUTER PROGRAM PRODUCT FOR PROCESSING PRIMITIVE SPECIFIC ATTRIBUTES GENERATED BY A FAST GEOMETRY SHADER

CLAIM OF PRIORITY

This application claims the benefit of U.S. Provisional Application No. 62/035,353 titled "PROCESSING OF PRIMITIVE SPECIFIC ATTRIBUTES PRODUCED BY A FAST GEOMETRY SHADER IN COMBINATION WITH A PROVOKING FIRST CONVENTION USED IN DIRECT3D," filed Aug. 8, 2014, the entire contents of which is incorporated herein by reference. This application is a continuation-in-part of U.S. application Ser. No. 13/843,916 titled "SYSTEM, METHOD, AND COMPUTER PROGRAM PRODUCT FOR GENERATING PRIMITIVE SPECIFIC ATTRIBUTES," filed Mar. 20, 2013, the entire contents of which is incorporated herein by reference.

FIELD OF THE INVENTION

The present invention relates to graphics processors, and more particularly to efficiently processing primitives utilizing graphics processors.

BACKGROUND

In some cases, a developer of a graphics application may desire to change an attribute of a primitive that is constant for the primitive in the graphics pipeline. However, when an input to a traditional geometry shader includes adjacent primitives that share common vertices, the output of the traditional geometry shader requires each primitive output to have unique vertices. The output of the additional vertices leads to a slowdown in a primitive processing rate of a graphics pipeline. There is thus a need for addressing these and/or other issues associated with the prior art.

SUMMARY

A system, method, and computer program product are provided for processing primitive-specific attributes. A portion of a graphics processor is determined to operate in a fast geometry shader mode and a vertex associated with a set of per-vertex attributes is determined to be a shared vertex. The shared vertex is determined to be a non-provoking vertex corresponding to a first primitive that is associated with a first set of per-primitive attributes and the shared vertex is determined to be a provoking vertex corresponding to a second primitive that is associated with a second set of per-primitive attributes. Only one set of the per-vertex attributes associated with the shared vertex is stored and only one of the second set of per-primitive attributes associated with the second primitive is stored.

BRIEF DESCRIPTION OF THE DRAWINGS

FIG. 6A shows shared vertices of primitives in a triangle strip, in accordance with one embodiment.

FIG. 6B shows attribute data that is shared for each vertex in FIG. 6A, in accordance with another embodiment.

DETAILED DESCRIPTION

Figure 1:
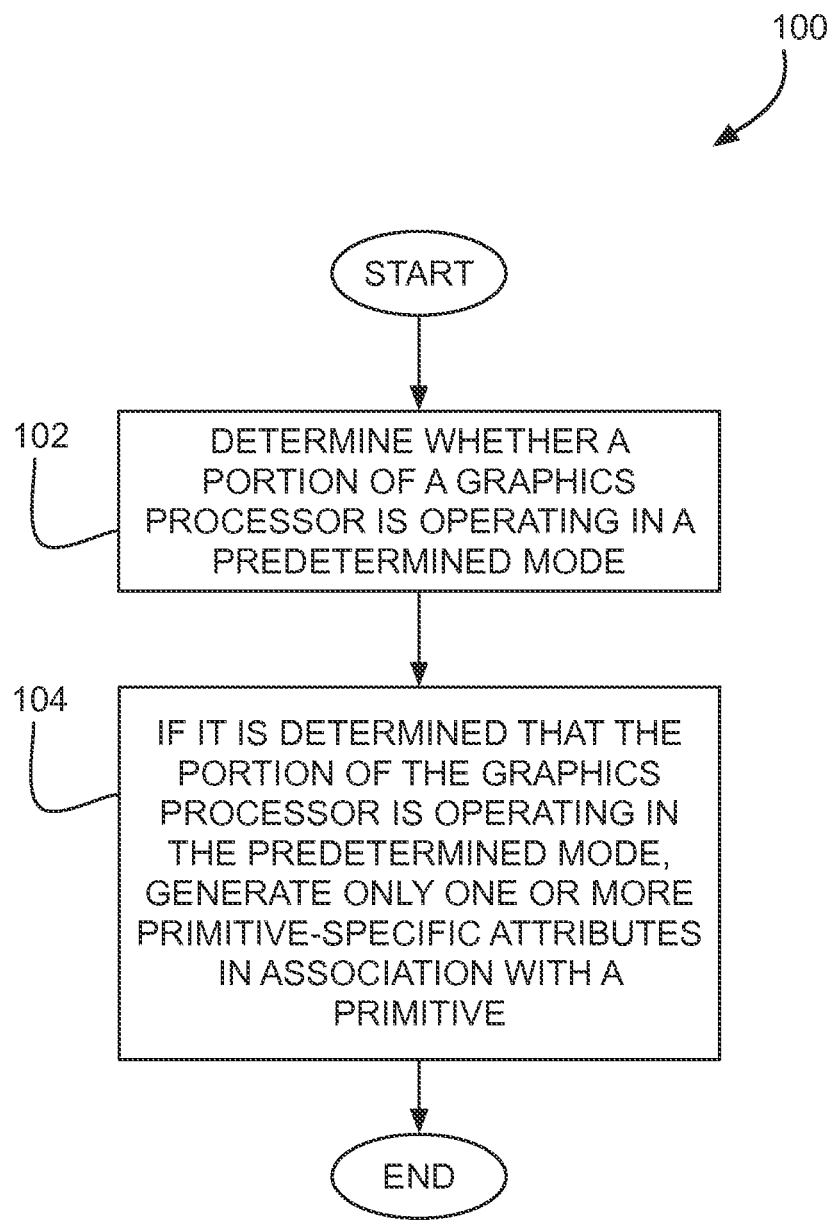
FIG. 1 shows a method for generating primitive-specific attributes, in accordance with one embodiment.

FIG. 1 shows a method 100 for generating primitive-specific attributes, in accordance with one embodiment. As shown, it is determined whether a portion of a graphics processor is operating in a predetermined mode. See operation 102. If it is determined that the portion of the graphics processor is operating in the predetermined mode, only one or more primitive-specific attributes are generated in association with a primitive. See operation 104. In one embodiment, the method 100 may include receiving as input a single primitive for which the primitive-specific attributes are generated, and outputting the single primitive.

In the context of the present description, a primitive refers to any element (e.g. a polygonal element, etc.) that is capable of being utilized to image a polygon (e.g. such as a triangle, a rectangle, etc.), or that is capable of being used to image a figure capable of being represented by polygons. Further, in the context of the present description, primitive-specific attributes refer to attributes that are associated with an entire primitive beyond just a subset portion (e.g. a vertex, etc.) thereof. For example, in various embodiments, the primitive-specific attribute may include a viewport index, a render target array index, a color attribute, a generic attribute, and/or a mask attribute, etc. In one embodiment, the primitive-specific attribute may not necessarily be limited to a specific vertex. For example, in one embodiment, only primitive-specific attributes may be generated in association with the primitive by avoiding generation of vertex-specific attributes.

In various embodiments, the graphics processor may include any number of graphics processor pipeline units, as well as associated hardware and software. For example, in one embodiment, the graphics processor may include a vertex shader, a tessellation initialization shader, a tessellation shader, and a geometry shader. Moreover, in one embodiment, the vertex shader and the geometry shader may each operate on a single streaming multiprocessor.

Further, in one embodiment, determining whether the portion of the graphics processor is operating in the predetermined mode may be carried out by hardware. In another embodiment, determining whether the portion of the graphics processor is operating in the predetermined mode may be carried out by software.

In one embodiment, the predetermined mode may include a mode associated with a geometry shader. For example, in one embodiment, the predetermined mode may include a mode where no expansion (or limiting expansion) of input geometry occurs as a result of geometry shader processing. In this case, in one embodiment, a one new vertex per triangle in a triangle strip may be maintained for the geometry shader output. In one embodiment, a less than one new vertex per triangle in a triangle strip may be maintained for the geometry shader output. For example, if a mesh is received an input, a mesh typically has fewer vertices than primitives (e.g. an 8×4 mesh of vertices has 42 primitives for 32 vertices, etc.). Furthermore, in one embodiment, the geometry shader need not copy per-vertex attributes from an input to an output.

Additionally, in one embodiment, the one or more vertex-specific attributes may be generated by a first stage of a pipeline of the graphics processor that is followed by a second stage of the pipeline of the graphics processor that generates the one or more primitive-specific attributes. For example, in one embodiment, the first stage may include at least one of a vertex shader, or a tessellation unit, etc., that are capable of generating the one or more vertex-specific attributes. In one embodiment, the second stage may include a geometry shader.

In the context of the present description, a vertex shader refers to any graphics processor related unit or units capable of transforming a three dimensional position of a vertex in virtual space to a two-dimensional coordinate (e.g. capable of being utilized for display, etc.). In one embodiment, the vertex shader may be configured to manipulate properties such as position, color, and texture coordinate.

Further, in the context of the present description, a tessellation unit refers to any unit or units associated with a graphics processor capable of being utilized to perform tessellation. Additionally, a geometry shader may refer to any unit or code that is capable of governing the processing of primitives. In one embodiment, the geometry shader may include a layered rendering capability. For example, in one embodiment, the geometry shader may cause a primitive to be rendered to a particular layer of a frame buffer.

Furthermore, in one embodiment, a plurality of vertices may be associated with the primitive, at least one of which may be a provoking vertex associated with the primitive. The provoking vertex of a primitive refers to the vertex that determines the constant primary and secondary colors when flat shading is enabled. In one embodiment, the provoking vertex for a triangle may include the last vertex used to assemble the primitive. In other embodiments, the provoking vertex may include the first or second vertex used in assembly.

In one embodiment, a policy may be in place that each primitive has a unique provoking vertex associated therewith. In this case, in one embodiment, the method 100 may include enforcing the policy that each primitive has a unique provoking vertex associated therewith. As an option, the policy may be enforced by invalidating any non-unique provoking vertex and replacing the same.

The primitive-specific attributes may be generated in association with the primitive in connection with any application. For example, in various embodiments, the one or more primitive-specific attributes may be generated in association with the primitive in connection with an application including at least one of voxelization, cube mapping, or cascaded shadow mapping, etc.

In the context of the present description, voxelization refers to the synthesis of voxel-represented objects. Further, cube mapping refers to a technique of environment mapping that uses a cube as the map shape, where the environment is projected onto six faces of a cube and stored as six square textures, or unfolded into six regions of a single texture. Cascaded shadow mapping refers to a shadow mapping technique capable of being implemented by splitting a camera view frustum and creating a separate depth-map for each partition (e.g. in an attempt to make a screen error constant, etc.).

In another embodiment, the primitive-specific attributes may be generated in association with an application including swizzling a plurality of coordinates of at least one vertex of the at least one primitive. In the context of the present description, swizzling refers to rearranging elements of a vector.

Further, in another embodiment, the method 100 may be utilized to avoid vertex expansion. For example, in one embodiment, only per-primitive attributes may be produced for a plurality of primitives and a connectivity of the primitives, as well as per-vertex attributes, may defined by a last pipeline stage prior to a geometry shader stage (e.g. a last world-space shading stage prior to the geometry shading stage, such as a vertex shader stage or a domain shader stage, etc.).

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
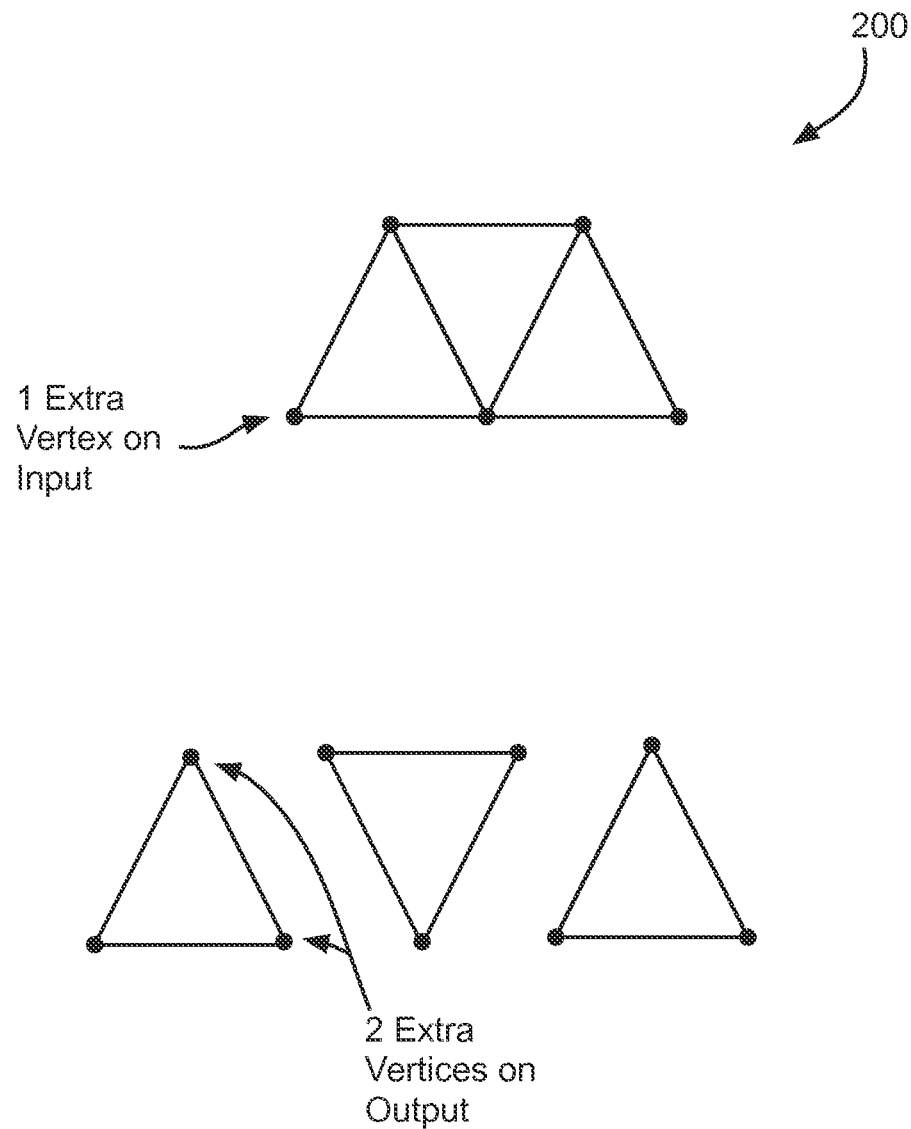
FIG. 2 shows an illustration of vertex expansion, in accordance with one embodiment.

FIG. 2 shows an illustration of vertex expansion 200, in accordance with one embodiment. As an option, the illustration 200 may be viewed in the context of the previous Figure and/or any subsequent Figure(s). Of course, however, the illustration 200 may be viewed in the context of any desired environment. It should also be noted that the aforementioned definitions may apply during the present description.

As shown, for triangle strips, if unique vertices are utilized for each triangle in a triangle strip for geometry shader processing, vertex expansion may occur. As an example, it may be desired to change an attribute of a primitive that is constant for the primitive in a graphics pipeline. However, when a triangle strip, triangle mesh, or the like is input into a traditional geometry shader, where adjacent primitives in the strip or mesh share common vertices, the output of a traditional geometry shader as defined by an API requires each primitive output to have unique vertices. For example, if the input is a triangle strip, then each triangle on input introduces one new vertex, whereas for a traditional geometry shader output, each triangle introduces three new vertices. This may lead to a 3× slowdown in the primitive processing rate of the graphics pipeline.

Often, it is desired to change only per-primitive attributes (i.e. attributes that are constant across the entire primitive, etc.). For example, it may be desired to change a viewport index of a primitive, a render target array index, or any other generic attribute that is constant.

Accordingly, in one embodiment, a fast geometry shader (FGS) may be implemented that produces just per-primitive attributes on output, and the connectivity of the primitives, as well as the per-vertex attributes, may be defined by the last world-space shading stage prior to a geometry shader stage, which, for example, may be a vertex shader stage or a domain shader stage.

Thus, in one embodiment, a property of one new vertex per triangle (or fewer) in a triangle strip may be maintained for a fast geometry shader output. Furthermore, the fast geometry shader need not copy per-vertex attributes from input to output (e.g. as a traditional geometry shader would operate, etc.). The fast geometry shader may reduce the number of unique vertices per primitive, which may improve a rate of viewport transform processing (e.g. preformed by a viewport clip/cull unit, etc.), and improve a rate setup processing (e.g. since only one new vertex per primitive needs to be fetched, etc.). Furthermore, the fast geometry shader may reduce the attribute traffic that flows between a world-space pipeline and a screen-space pipeline. Accordingly, the fast geometry shader may operate to reduce attribute bandwidth and attribute storage.

Further, in one embodiment, a unique provoking vertex may be identified for each primitive. For example, in one embodiment, a viewport clip/cull unit (e.g. positioned subsequent to the fast geometry shader, etc.) may ensure a unique provoking vertex for each primitive that is sent downstream to the rest of the pipeline. For example, this may be implemented to allow the viewport clip/cull unit to copy the per-primitive attributes into the provoking vertex for each primitive. In one embodiment, the viewport clip/cull unit may invalidate the provoking vertex if the provoking vertex is already present in an associated vertex cache, and the viewport clip/cull unit may create a new instance that is specific to the primitive being processed. In the context of the present description, a viewport clip/cull unit refers to any unit or group of units capable of performing clipping, culling, perspective correction, and viewport scaling operations on primitive data.

Further, in one embodiment, where the fast geometry shader is implemented to limit or prohibit expansion of input geometry, an optimization in the graphics pipeline may be applied such that a vertex shader and the fast geometry shader may be run in sequence on the same streaming multiprocessor without performing a re-distribution of geometry between the vertex shader and the fast geometry shader stages. In one embodiment, this may be implemented to avoid copying attributes between streaming multiprocessors. This may, in turn, eliminate overhead of time slicing between stages that normally require re-distribution (e.g. between a first stage including a vertex attribute fetch, vertex shader operation, hull shader operation, and task generation, and a second stage including topology generation, domain shader operation, geometry shader operation, and viewport clip/cull operation, etc.).

Still yet, in one embodiment, a driver may be utilized to detect when to apply a fast geometry shader optimization through examination of a traditional geometry shader. Thus, in one embodiment, a fast geometry shader optimization may be implemented automatically utilizing a traditional geometry shader, without developer involvement. For example, a driver may detect that geometry shader code simply copies all per-vertex attributes from input to output and only change per-primitive attributes, such that there is a one to one input to output correspondence of primitives (e.g. the driver may cause a traditional geometry shader to function as a fast geometry shader, automatically, etc.). Thus, in one embodiment, the fast geometry shader optimization does not necessarily need to be exposed at an API level to be effective. Of course, in one embodiment, the fast geometry shader optimization may be exposed at the API level, where a programmer may explicitly declare the geometry shader as being of this nature (e.g. such as through a "pass-through" specifier, etc.).

Utilizing the fast geometry shader optimization makes it possible to specify per-primitive attributes in a geometry shader stage following either vertex shading or tessellation in an efficient manner, without introducing an unnecessary expansion of vertices. In various embodiments, this feature may be implemented in the context of voxelization, cube map rendering, and/or cascaded shadow maps, etc.

As an example, in the case of voxelization, cube mapping, and/or cascaded shadow mapping, it may be desirable to project primitives to multiple viewports/render targets. In the case of voxelization, for example, in one embodiment, a geometry shader may be utilized to identify a dominant direction of a primitive. In this case, in one embodiment, the geometry shader may project the primitive to a corresponding three-dimensional volume.

In the case of cube mapping, in one embodiment, a geometry shader may be utilized to identify the faces of a cube map to which a primitive projects. In this case, in one embodiment, a multi-projection engine may project the primitive to each of the identified faces. Of course, it is desired that such projection occur in an efficient manner. In one embodiment, a viewport array mask attribute, which is a per-primitive attribute, may be utilized to accomplish this.

In one embodiment, world-space processing (e.g. a first stage, etc.) of a primitive may be performed exactly once. Additionally, in one embodiment, the world-space processing of a primitive may be performed exactly once, regardless of a number of viewports/render targets a primitive is projected.

Furthermore, sharing of vertices between adjacent primitives may be maintained for a particular projection. In one embodiment, vertices between adjacent primitives may be maintained, in order to maintain a one new vertex per primitive ratio for triangle strips that all project to the same surface. In another embodiment, a greater than one new vertex per primitive ratio for triangle strips may be maintained. In another embodiment, a less than one new vertex per primitive ratio for triangle strips may be maintained. Additionally, in one embodiment, a primitive may be completely culled if it does not project to any surface based on a world-space shader evaluation.

In the case of projecting a primitive to multiple viewports (i.e. viewport multi-cast, etc.), in one embodiment, a unit associated with a graphics processor (e.g. a shader, a tessellation unit, etc.) may specify a set of viewports into which a primitive is to be output. In one embodiment, a data structure may be associated with each primitive, where the data structure specifies the set of viewports to which a primitive is to be output.

In one embodiment, the data structure may include a form of a bitmask (e.g. a 16-bit bitmask, etc.), where each bit in the bitmask corresponds to a viewport slot at that bit position. For example, in one embodiment, a set bit in the bitmask may indicate that a primitive is to be output to a viewport that is associated with that bit position. In one embodiment, multiple bits may be set, in which case the same primitive may be output (e.g. multicast, etc.) to the viewports corresponding to the set bits. In the case that no bits are set in the mask, in one embodiment, the primitive may be silently discarded (e.g. killed, etc.) such that no further processing is performed for that primitive.

Furthermore, in one embodiment, a render target array index generated (e.g. by a geometry shader, etc.) may be configured to be offset by the viewport slot number for each output. In one embodiment, the offset render target array index may be implemented in concert with a non-expanding fast geometry shader implementation, which allows the geometry shader to run at virtually no overhead.

As noted, viewport multi-cast may be implemented to avoid introducing vertex expansion by sharing vertices between adjacent primitives that are output to the same viewport. For example, in some cases, at least a portion of the graphics processing pipeline (e.g. a portion for performing clipping, culling, viewport transform, and perspective correction, etc.) may have a limited vertex cache. In this case, to ensure hits in the vertex cache, in one embodiment, all the primitives that are sent to the same viewport may be processed consecutively.

More information associated with viewport multicasting may be found in U.S. patent application Ser. No. 13/843,981, titled "SYSTEM, METHOD, AND COMPUTER PROGRAM PRODUCT FOR EXECUTING PROCESSES INVOLVING AT LEAST ONE PRIMITIVE IN A GRAPHICS PROCESSOR, UTILIZING A DATA STRUCTURE," filed Mar. 15, 2013, now published US2014-0267260, which is incorporated herein by reference in its entirety.

In another embodiment, a render target array index may be configured to be offset by the viewport slot number, the render target array index may be guaranteed not to wrap (e.g. by shader examination, etc.), and all primitives may have the same base render target array index (e.g. such as when an array index is not generated by a geometry shader, and a class default is used instead, etc.). In this case, in one embodiment, primitives may be processed in a viewport order since the viewports are guaranteed to go to different render targets, and there are no API imposed ordering requirements between different render targets. In yet another embodiment, the application may explicitly specify in the API whether to process primitives in a viewport order or in a strict primitive order. In yet another embodiment, hardware may be utilized to determine whether to process primitives in a viewport order or in a strict primitive order.

Further, in one embodiment, when processing primitives in a viewport order, a unit in the graphics processing pipeline (e.g. a unit for performing clipping, culling, viewport transform, and/or perspective correction, etc.), may read the viewport mask for all primitives in a batch, and may then process the output primitives in the batch by traversing all output primitives for a particular viewport before moving on to the next viewport. In one embodiment, when processing primitives in a strict primitive order, the pipeline portion (or unit, etc.) may process all output primitives (i.e. all viewports) for a particular input primitive before moving on to the next input primitive.

In another embodiment, the graphics processing pipeline (or a portion thereof) may be configured to implement viewport coordinate swizzling. In one embodiment, viewport coordinate swizzling may introduce additional coordinate transformation just after a vertex or geometry shader, and before a clipping and perspective divide. In one embodiment, the transformation may include a programmable permutation over vertex position coordinate components (x, y, z, w) with optional negation. Further, in one embodiment, the transformation may be specified as part of viewport state, and may take the form of a mask (e.g. a 12-bit mask, etc.). For example, in one embodiment, the mask may include three bits per coordinate, to pick one out of eight choices for each coordinate: +x, −x, +y, −y, +z, −z, +w, −w.

In various embodiments, several different swizzling transformations may be specified by using different viewports (e.g. one per viewport, etc.). In this case, in one embodiment, the geometry shader may then pick a desired swizzling transformation by routing output primitives to the corresponding viewport. In one embodiment, this feature may be implemented in concert with a non-expanding fast geometry shader implementation.

Utilizing these techniques, unnecessary expansion of vertices due to a geometry shader generating unique vertices for each primitive may be avoided. In some embodiments, this may improve a primitive processing rate, avoiding the overhead of additional attribute traffic and attribute storage in the pipeline. Furthermore, in some embodiments, the geometry shader shading workload may be reduced by moving the operations of multi-cast and coordinate swizzle into fixed function hardware.

Figure 3:
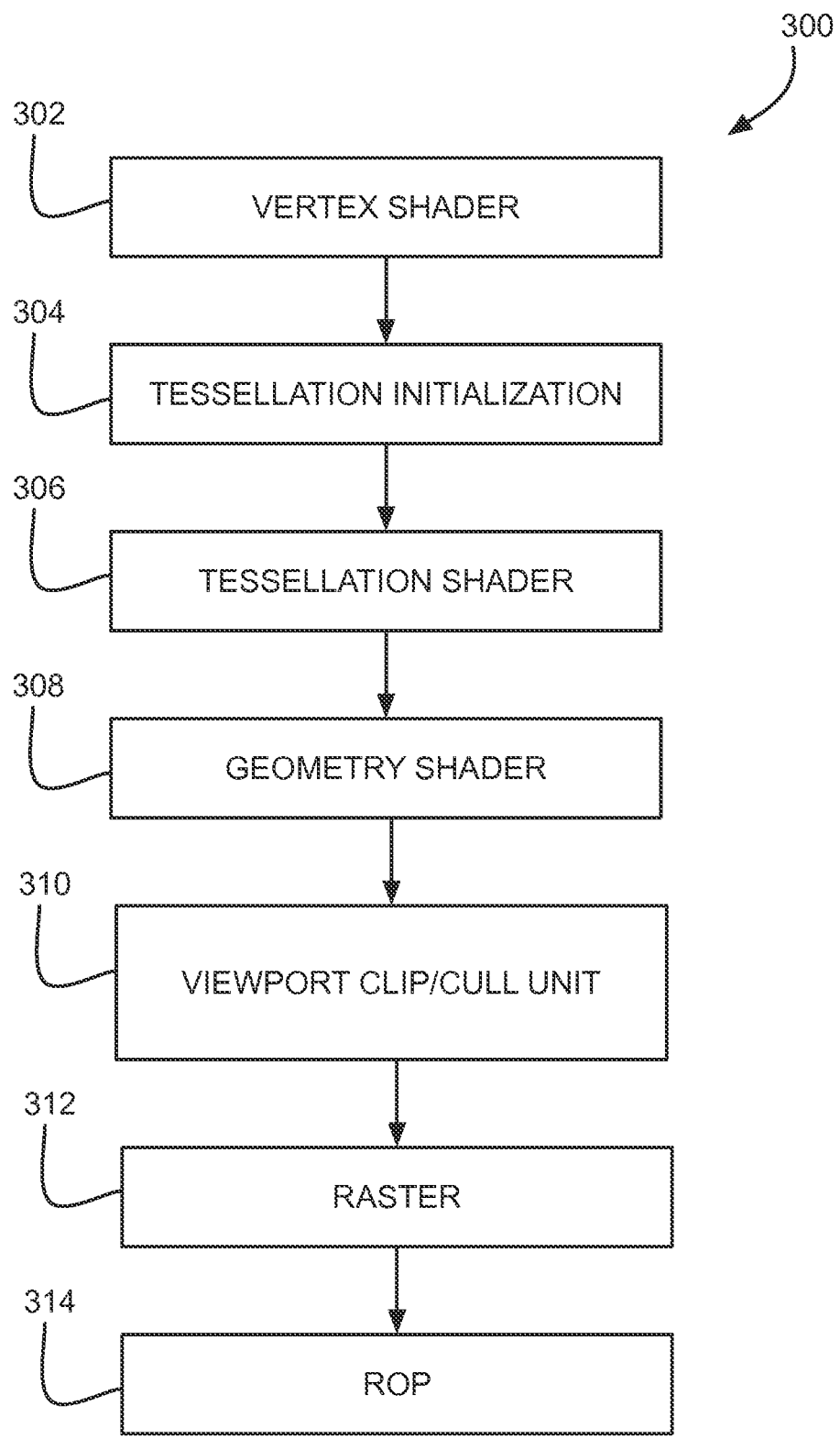
FIG. 3 shows a graphics processing pipeline, in accordance with one embodiment.

FIG. 3 shows a graphics processing pipeline 300, in accordance with one embodiment. As an option, the graphics processing pipeline 300 may be implemented in the context of the functionality and architecture of the previous Figures and/or any subsequent Figure(s). Of course, however, the graphics processing pipeline 300 may be implemented in any desired environment. It should also be noted that the aforementioned definitions may apply during the present description.

As shown, the graphics processing pipeline 300 may include at least one vertex shader 302, a tessellation initialization unit 304, a tessellation shader 306, and a geometry shader 308. In one embodiment, the vertex shader 302, the tessellation initialization unit 304, the tessellation shader 306, the geometry shader 308, and/or hardware/software associated therewith, may represent a stage of the graphics processing pipeline 300 (e.g. a "world-space shader pipeline," or "shader pipeline." etc.).

Furthermore, in one embodiment, the graphics processing pipeline 300 may include a viewport clip/cull unit 310, a raster unit 312, and a raster operations (ROP) unit 314. In one embodiment, the shader pipeline may operate within a streaming multiprocessor. Further, in one embodiment, the shader pipeline may include a plurality of shader units that may be enabled to process primitive data. In one embodiment, the vertex shader 302, the tessellation initialization unit 304, the tessellation shader 306, the geometry shader 308, and/or hardware/software associated therewith, may sequentially perform processing operations. Once the sequential processing operations performed by the shaders within shader pipeline are complete, in one embodiment, the viewport clip/cull unit 310 may utilize the data.

In one embodiment, primitive data processed by the shader pipeline may be written to cache (e.g. L1 cache, a vertex cache, etc.). In this case, in one embodiment, the viewport clip/cull unit 310 may access the data in the cache. In one embodiment, the viewport clip/cull unit 310 may perform clipping, culling, perspective correction, and viewport scaling operations on primitive data.

In one embodiment, the viewport clip/cull unit 310 may be configured to perform a bounding-box calculation with the primitives to determine which region of a display each graphics primitive belongs. In one embodiment, this information may be used to route each primitive to one of a plurality of raster units, such as raster unit 312. In one embodiment, each raster unit may rasterize graphics primitives and fragments of graphics primitives that overlap a particular region of the display. Additionally, in one embodiment, the raster operations unit 314 may include a processing unit that performs raster operations, such as stencil, z test, and the like, and may output pixel data as processed graphics data.

Further, in one embodiment, the viewport clip/cull unit 310 may be configured to read a data structure associated with a primitive. For example, in one embodiment, the viewport clip/cull unit 310 may read a mask for all primitives in a batch. The viewport clip/cull unit 310 may then process the output primitives in the batch by traversing all output primitives for a particular viewport before moving on to the next viewport. In another embodiment, the viewport clip/cull unit 310 may process all output primitives (i.e. all viewports, etc.) for a particular input primitive before moving on to the next input primitive.

In one embodiment, the viewport clip/cull unit 310 may be configured to invalidate the provoking vertex if the provoking vertex is already present in an associated vertex cache, and the viewport clip/cull unit 310 may create a new instance that is specific to the primitive being processed. In the context of the present description, a viewport clip/cull unit refers to any unit or group of units capable of performing clipping, culling, perspective correction, and viewport scaling operations on primitive data.

Further, in one embodiment, where the fast geometry shader mode is implemented to limit or prohibit expansion of input geometry, an optimization in the graphics pipeline may be applied such that the vertex shader 302 and the geometry shader 308 may be run in sequence on the same streaming multiprocessor without performing a re-distribution of geometry between the vertex shader 302 and the fast geometry shader 308 stages. In one embodiment, this may be implemented to avoid copying attributes between streaming multiprocessors. This may, in turn, eliminate overhead of time slicing between stages that normally require re-distribution (e.g. between a first stage including a vertex attribute fetch, vertex shader operation, hull shader operation, and task generation, and a second stage including topology generation, domain shader operation, geometry shader operation, and viewport clip/cull operation, etc.).

Figure 4A:
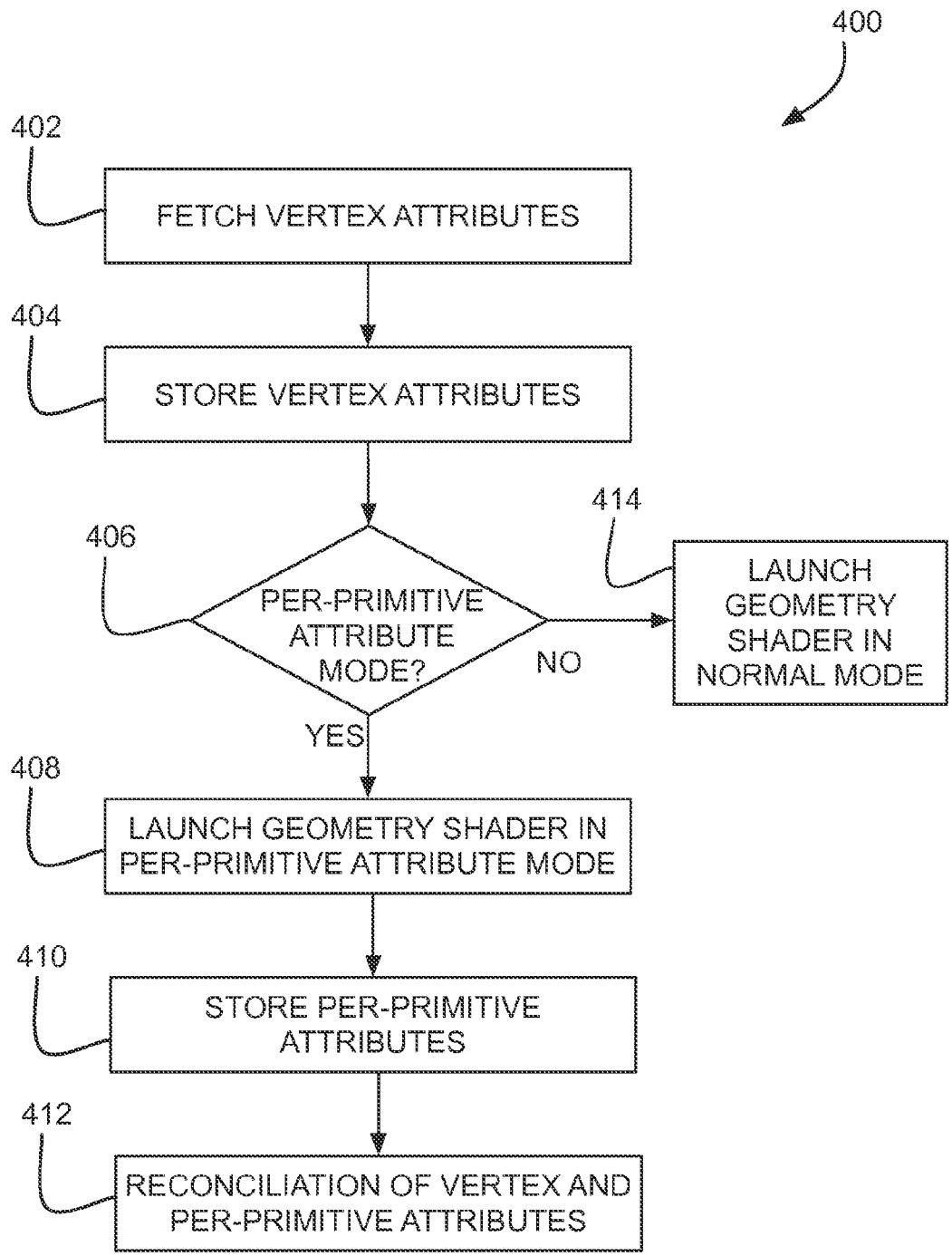
FIG. 4A shows a method for generating primitive-specific attributes, in accordance with another embodiment.

FIG. 4A shows a method 400 for generating primitive-specific attributes, in accordance with another embodiment. As an option, the method 400 may be implemented in the context of the functionality and architecture of the previous Figures and/or any subsequent Figure(s). Of course, however, the method 400 may be carried out in any desired environment. It should also be noted that the aforementioned definitions may apply during the present description.

As shown, vertex attributes are fetched as part of a graphics pipeline process. See operation 402. In one embodiment, the vertex attributes may be fetched as part of a vertex shader unit process. In another embodiment, the vertex attributes may be fetched prior to a vertex shader unit process.

The vertex attributes are then stored. See operation 404. In one embodiment, the vertex attributes may be written to Level 1 cache. In another embodiment, the vertex shader output may be written to a buffer.

As shown further, it is determined whether a geometry shader is to operate in a per-primitive attribute mode. See decision 406. In one embodiment, a driver may be utilized to detect whether a geometry shader is to operate in a per-primitive attribute mode (e.g. whether to utilize fast geometry shader optimization, etc.). For example, a driver may cause a change to operate utilizing only per-primitive attributes, such that there is a 1:1 input to output correspondence of primitives.

If it is determined that a geometry shader is to operate in per-primitive attribute mode, the geometry shader is launched to operate in per-primitive attribute mode (e.g. a fast geometry shader mode, etc.). See operation 408. Furthermore, per-primitive attributes are stored (e.g. in L1 cache, in a vertex cache, etc.). See operation 410.

Still yet, vertex and per-primitive attributes are reconciled. See operation 412. If it is determined that a geometry shader is not to operate in per-primitive attribute mode, the geometry shader is launched to operate in a normal mode (e.g. traditional geometry shader mode, etc.). See operation 414.

Figure 4B:
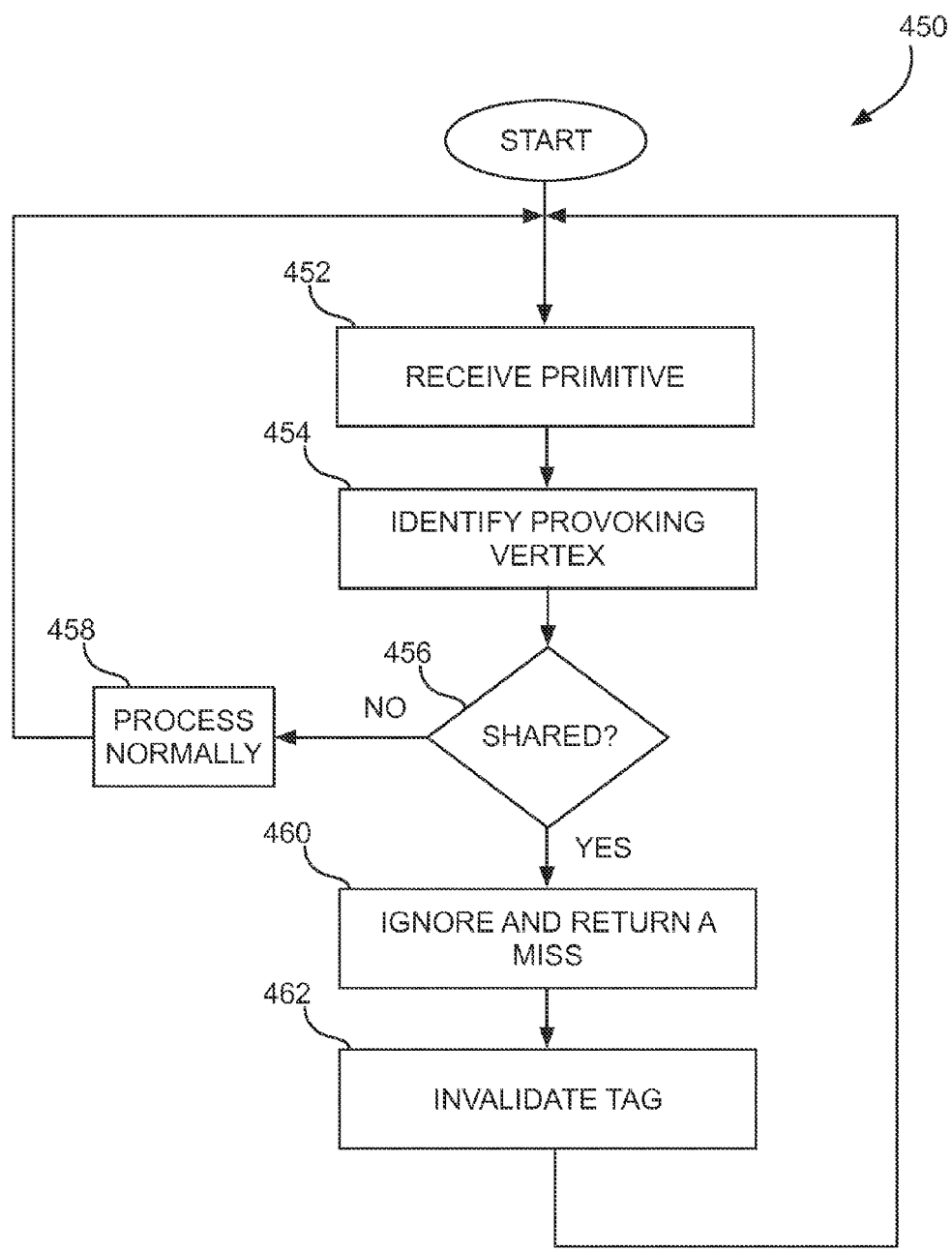
FIG. 4B shows a method for identifying a provoking index, in accordance with one embodiment.

FIG. 4B shows a method 450 for identifying a provoking index, in accordance with another embodiment. As an option, the method 450 may be implemented in the context of the functionality and architecture of the previous Figures and/or any subsequent Figure(s). Of course, however, the method 450 may be carried out in any desired environment. It should also be noted that the aforementioned definitions may apply during the present description.

As shown, a primitive is received (e.g. by a viewport clip/cull unit, etc.). See operation 452. Further, a provoking vertex is identified. See operation 454.

The provoking vertex of a primitive refers to the vertex that determines the constant primary and secondary colors when flat shading is enabled. In one embodiment, the provoking vertex for a triangle may include the last vertex used to assemble the primitive. In other embodiments, the provoking vertex may include any vertex.

As shown further, it is determined whether the provoking vertex is a shared vertex. See decision 456. If the provoking vertex is not a shared vertex, the vertex is processed normally. See operation 458. If the provoking vertex is a shared vertex, the vertex is ignored and a miss is returned and a new instance of the provoking vertex is created. See operation 460. Furthermore, a tag associated with the vertex is invalidated (e.g. a tag stored in cache, etc.). See operation 462.

For example, in one embodiment, a viewport clip/cull unit 310 (e.g. positioned subsequent to the fast geometry shader, etc.) may ensure a unique provoking vertex for each primitive that is sent downstream to the rest of the pipeline. In one embodiment, this may be implemented to allow the viewport clip/cull unit 310 to copy the per-primitive attributes into the provoking vertex for each primitive. In one embodiment, the viewport clip/cull unit 310 may invalidate the provoking vertex if it is already present in an associated vertex cache, and the viewport clip/cull unit 310 may create a new instance that is specific to the primitive being processed. In another embodiment, units earlier in the pipeline may be configured to guarantee a unique provoking vertex for each primitive. Specifically, in one embodiment, for the non-tessellation case, a PD unit, also called primitive distributor, may ensure a unique provoking vertex for each primitive when constructing a batch. In another embodiment, for the tessellation case, the tessellation unit may ensure a unique provoking vertex for each tessellated primitive.

Processing of Primitive Specific Attributes with a Provoking First Convention

As previously explained the viewport clip/cull unit 310 ensures that each primitive has a unique provoking vertex.

When the viewport clip/cull unit 310 detects a conflict where two primitives have the same provoking vertex, the viewport clip/cull unit 310 creates a new instance of a provoking vertex for the second primitive. In other words, the provoking vertex is duplicated or copied. In one embodiment, the provoking vertex is stored in two separate entries of a cache (e.g., a vertex cache, an L1 cache, an L2 cache, etc.), where a first cache entry is referenced by a first primitive and a second cache entry is referenced by a second primitive. The first cache entry may store the primitive specific attributes (i.e., set of per-primitive attributes) for the first primitive and the second cache entry may store the primitive specific attributes for the second primitive.

The viewport clip/cull unit 310 may be configured to generate the fewest number of vertices on output for the best performance. Therefore, when a shared vertex is a provoking vertex for a first primitive and is a non-provoking vertex for a second primitive, the vertex is shared and is not duplicated. The cache entry storing the per-vertex attributes (i.e., set of per-vertex attributes) for the shared vertex is referenced by both the first primitive and the second primitive. The cache entry may also store the per-primitive attributes for the first primitive.

Figures 5A, 5B:
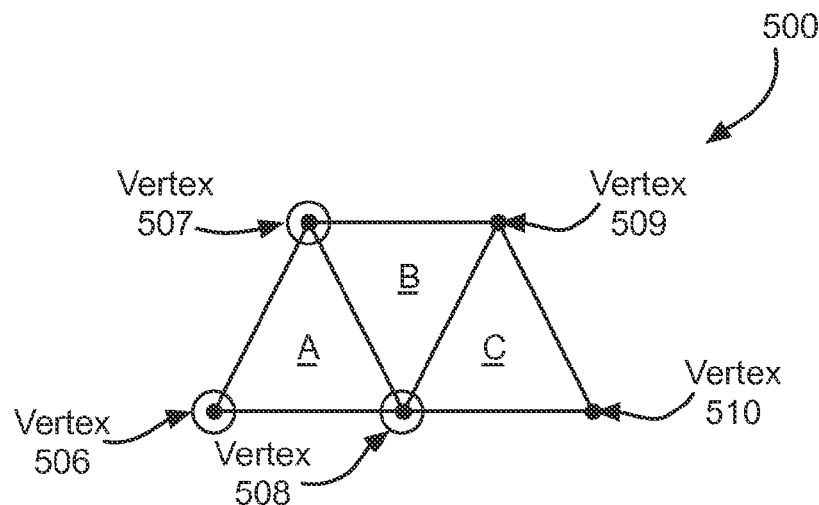
FIG. 5A shows shared vertices of primitives in a triangle strip, in accordance with one embodiment.
FIG. 5B shows attribute data that is shared for each vertex in FIG. 5A, in accordance with one embodiment.

FIG. 5A shows shared vertices of primitives in a triangle strip 500, in accordance with one embodiment. The Microsoft® Direct3D® API requires that the provoking vertex be the first vertex of a primitive. Each provoking vertex is indicated with a circle. A primitive A is defined by a provoking vertex 506, a non-provoking vertex 507, and a non-provoking vertex 508. Vertices 507 and 508 are shared vertices that are each also provoking vertices for different primitives.

A primitive B is defined by the provoking vertex 507, the non-provoking vertex 508, and a non-provoking vertex 509. A primitive C is defined by the provoking vertex 508, the non-provoking vertex 509, and a non-provoking vertex 510. In the context of the following description, a shared vertex is a vertex that is used to define two or more primitives. A shared vertex is a non-provoking vertex for one or more primitives and may also be a provoking vertex for exactly one primitive. For example, vertex 507 is a shared vertex that is a non-provoking vertex for primitive A and a provoking vertex for primitive B. It will be appreciated that, in some cases, a shared vertex may is not a provoking vertex for any of the primitives the vertex is shared. For example, vertex 509 is a shared vertex but is not a provoking vertex of any of primitives A, B, or C.

When the viewport clip/cull unit 310 is configured to use the method 450 shown in FIG. 4B, a new instance of a shared vertex is created when the shared vertex is also a provoking vertex. Copying each provoking vertex that is shared has the undesired effect of generating two copies of the vertices 507 and 508, because each of the vertices is a non-provoking vertex and subsequently, for a different primitive, is a provoking vertex.

FIG. 5B shows attribute data that is shared for each vertex in FIG. 5A, in accordance with one embodiment. The viewport clip/cull unit 310 receives an input stream of primitives based on the Direct3D® API convention that requires the first vertex to be the provoking vertex for the primitive. In one embodiment, the input stream includes indices corresponding to each vertex and an index for a vertex is used to read the per-vertex attributes for the vertex.

When the provoking vertex 506 is received, the viewport clip/cull unit 310 inserts the per-vertex attributes for the vertex 506 into the output stream. Because vertex 506 is the provoking vertex, the viewport clip/cull unit 310 also inserts the per-primitive attributes for the primitive A into the output stream.

In the context of the following description processing may include performing arithmetic operations on the attributes and/or storing the attributes, where the attributes may be the per-vertex attributes and/or the per-primitive attributes. In one embodiment, the per-vertex attributes and/or the per-primitive attributes may be processed and then stored in a cache. In one embodiment, the per-vertex attributes are processed and then stored in the cache and the per-primitive attributes are stored in the cache to be processed later. In one embodiment, the per-primitive attributes for a primitive are stored in the same cache entry as the per-vertex attributes for the provoking vertex that defines the primitive.

A provoking bit may be stored for each cache entry indicating whether the vertex corresponding to the cache entry has been processed as a provoking vertex. When the provoking bit is set (i.e., asserted or TRUE), the cache entry stores the per-vertex attributes for the vertex and the per-primitive attributes of the primitive for which the vertex is a provoking vertex. When the provoking bit is not set (i.e., negated or FALSE), the cache entry stores only the per-vertex attributes for the vertex (assuming the cache entry is valid). Therefore, the provoking bit is set for the cache entry that stores the per-vertex attributes for vertex 506 and the per-primitive attributes for the primitive A.

When the non-provoking vertex 507 is received for primitive A, the viewport clip/cull unit 310 inserts the per-vertex attributes for the vertex 507 into the output stream. When the non-provoking vertex 508 is received for primitive A, the viewport clip/cull unit 310 inserts the per-vertex attributes for the vertex 508 into the output stream.

Primitive B follows primitive A in the input stream. When the provoking vertex 507 is received, the viewport clip/cull unit 310 determines that the per-vertex attributes have already been output in the output stream and does not insert the per-vertex attributes for the vertex 507 into the output stream. In other words, vertex 507 is a shared vertex and there is a cache hit for the vertex 507. However, because vertex 507 is the provoking vertex, the viewport clip/cull unit 310 inserts the per-primitive attributes for the primitive B into the output stream. The provoking bit is set for the cache entry that stores the per-vertex attributes for vertex 507 and the per-primitive attributes for the primitive B. Importantly, the per-vertex attributes for the vertex 507 are not duplicated or copied when the vertex 507 is received as a provoking vertex after being previously received as a non-provoking vertex. Also the per-primitive attributes for the primitive B are only inserted into the output stream once and/or stored in one cache entry.

When the non-provoking vertex 509 is received for primitive B, the viewport clip/cull unit 310 determines that vertex 509 is a new vertex (i.e., there is not a cache hit) and inserts the per-vertex attributes for the vertex 509 into the output stream. When the non-provoking vertex 508 is received for primitive B, the viewport clip/cull unit 310 determines that vertex 508 is a shared vertex and does not insert the per-vertex attributes for the vertex 508 into the output stream.

Primitive C follows primitive B in the input stream. When the provoking vertex 508 is received, the viewport clip/cull unit 310 determines the vertex 508 is a shared vertex and does not insert the per-vertex attributes for the vertex 508 into the output stream. In other words, there is a cache hit for the vertex 507. However, because vertex 508 is the provoking vertex, the viewport clip/cull unit 310 inserts the per-primitive attributes for the primitive C into the output stream. The provoking bit is set for the cache entry that stores the per-vertex attributes for vertex 508 and the per-primitive attributes for the primitive C.

When the non-provoking vertex 509 is received for primitive C, the viewport clip/cull unit 310 determines that vertex 509 is a shared vertex and does not insert the per-vertex attributes for the vertex 509 into the output stream. When the non-provoking vertex 510 is received for primitive C the viewport clip/cull unit 310 determines that vertex 510 is a new vertex (i.e., there is not a cache hit) and inserts the per-vertex attributes for the vertex 510 into the output stream.

Figure 5C:
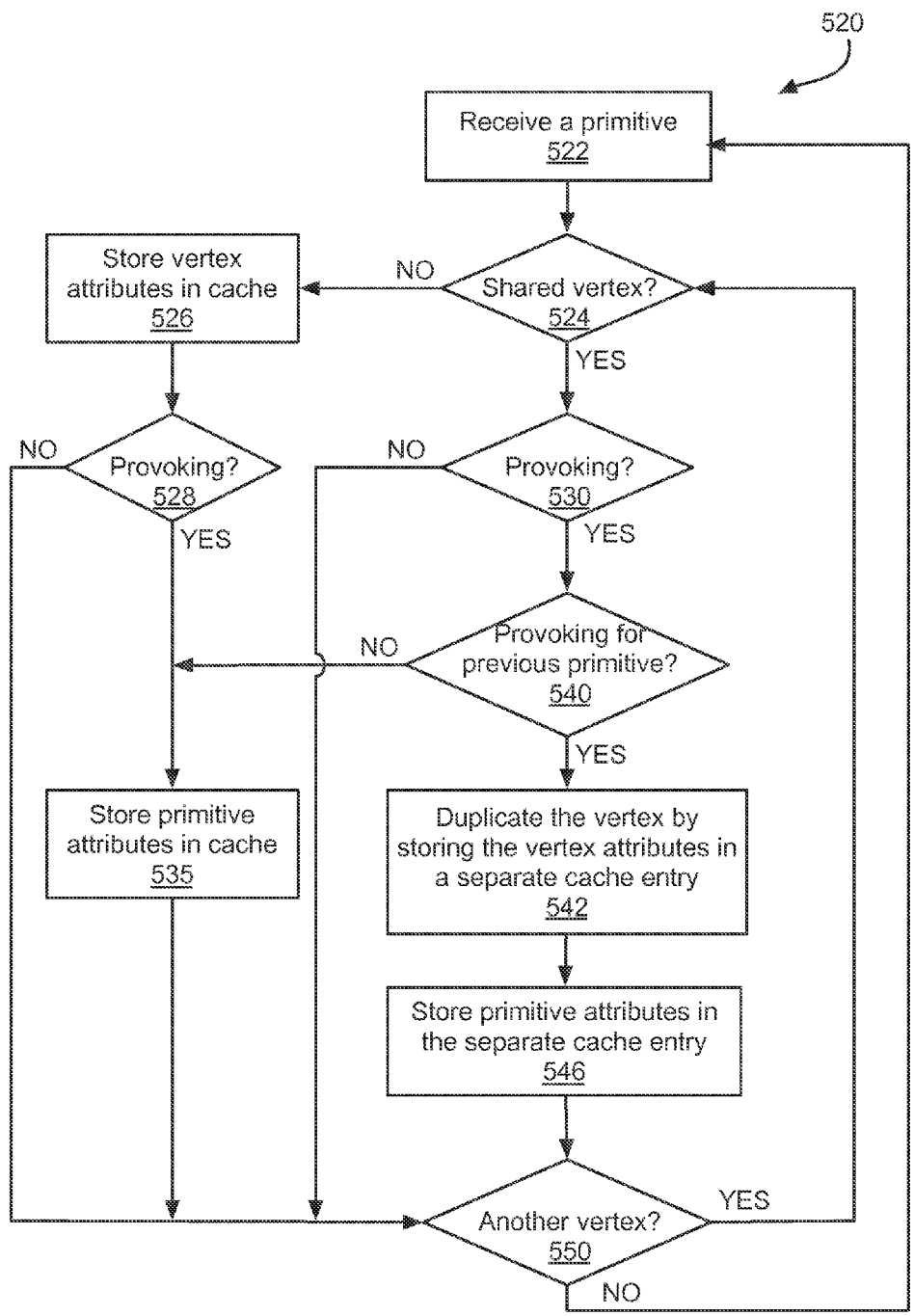
FIG. 5C shows a method for processing the shared vertices, in accordance with one embodiment.

FIG. 5C shows a method 520 for processing the shared vertices, in accordance with one embodiment. At step 522, the viewport clip/cull unit 310 receives a primitive. Each primitive is associated with a set of per-primitive attributes. A primitive is defined by one or more vertices and each vertex is associated with a set of per-vertex attributes.

At step 524, the viewport clip/cull unit 310 determines if a vertex defining the primitive is a shared vertex. In one embodiment, the viewport clip/cull unit 310 determines a vertex is shared when a cache hit occurs indicating that the per-vertex attributes for the shared vertex are stored in an entry of the cache. The viewport clip/cull unit 310 avoids storing duplicate copies of shared vertices or creating a new vertex for each shared vertex.

If, at step 522, the viewport clip/cull unit 310 determines that the vertex is shared, then at step 530, the viewport clip/cull unit 310 determines if the shared vertex is a provoking vertex for the primitive. In one embodiment, when the Direct3D® API convention is used, the provoking vertex is the first vertex defining the primitive. In one embodiment, when the OpenGL® API convention is used, the provoking vertex is the last vertex defining the primitive.

If, at step 530, the viewport clip/cull unit 310 determines that the shared vertex is not a provoking vertex for the primitive, then the shared vertex is a non-provoking vertex and the viewport clip/cull unit 310 proceeds directly to step 550 because the shared vertex is already stored in the cache. Otherwise, at step 530, the viewport clip/cull unit 310 determines that the shared vertex is a provoking vertex for the primitive, and then, at step 540, the viewport clip/cull unit 310 determines if the shared vertex is also a provoking vertex for another (i.e., previous) primitive.

In one embodiment, the viewport clip/cull unit 310 determines that the shared vertex is a provoking vertex for another primitive when the provoking flag associated with the cache entry is set. If, at step 540 the viewport clip/cull unit 310 determines that the shared vertex is not a provoking vertex for another (i.e., previous) primitive, then at step 535, the viewport clip/cull unit 310 stores the per-primitive attributes in the cache and the provoking flag associated with the cache entry is set. In one embodiment, the per-primitive attributes are stored in the same cache entry as the provoking vertex for the primitive. Importantly, each set of per-primitive attributes is only stored once and is only output by the viewport clip/cull unit 310 in the output stream once.

At step 550, the viewport clip/cull unit 310 determines if another vertex should be processed for the primitive. If another vertex should be processed, the viewport clip/cull unit 310 returns to step 524. Otherwise, the viewport clip/cull unit 310 returns to step 522.

If, at step 524 the viewport clip/cull unit 310 determines that a vertex defining the primitive is not a shared vertex, the vertex is a new vertex and, at step 526, the viewport clip/cull unit 310 stores the new vertex in the cache. At step 528, the viewport clip/cull unit 310 determines if the new vertex is a provoking vertex for the primitive, and, if not, the viewport clip/cull unit 310 proceeds directly to step 550. Otherwise the vertex is a provoking vertex for the primitive and, at step 535, the viewport clip/cull unit 310 stores the per-primitive attributes in the cache and the provoking flag associated with the cache entry is set. The viewport clip/cull unit 310 then proceeds directly to step 550.

If, at step 540 the viewport clip/cull unit 310 determines that the shared vertex is a provoking vertex for another (i.e., previous) primitive, then at step 542, the viewport clip/cull unit 310 creates a new vertex by storing the per-vertex attributes in a separate cache entry (i.e., duplicating or copying the per-vertex attributes). Only shared vertices that are also provoking vertices for two different primitives cause the per-vertex attributes to be duplicated and stored in two separate cache entries. At step 546, the viewport clip/cull unit 310 stores the per-primitive attributes in the cache and the provoking flag associated with the cache entry is set before the viewport clip/cull unit 310 proceeds to step 550.

The algorithm performed by the viewport clip/cull unit 310 reduces duplication, processing, and storing of the per-vertex attributes compared with the algorithm shown in FIG. 4B that duplicates all shared vertices. In sum, when a vertex is first seen as a non-provoking vertex, the per-vertex attributes are processed. Later, when the vertex is a shared vertex that is also a provoking vertex for the current primitive, only the per-primitive attributes are processed, since the per-vertex attributes were previously processed. When a vertex is first seen and is also a provoking vertex, both the per-vertex attributes and the per-primitive attributes are processed. However, because the vertex is marked as having been processed (by setting the provoking bit), the vertex is not processed again if it is seen as a non-provoking vertex. If another primitive is defined by the same provoking vertex, then a new vertex instance is created. The per-vertex attributes and the per-primitive attributes for the different primitive are processed for the new vertex instance. TABLE 1 summarizes the algorithm that is performed by the viewport clip/cull unit 310 for one embodiment.

TABLE 1

```
If (provoking vertex)
{
    If (hit in the vertex cache and provoking bit is clear)
    {
        Set the provoking bit in the vertex cache
        Process the per-primitive attributes only since the per-
            vertex attributes were previously processed by a
            non-provoking vertex
    }
    Else // hit and provoking bit is set or cache miss
    {
        Force miss in the vertex cache
        Set the provoking bit in the vertex cache
        Process the per-primitive attributes
        Process the per-vertex attributes
    }
}
Else // this is a non-provoking vertex
{
    If (hit in the vertex cache) // the vertex has already been processed
    {
        Use the reference to the vertex cache entry
    }
    Else // vertex cache miss, the vertex has not been processed
    {
        Clear the provoking bit in the vertex cache
        Process the per-vertex attributes only
    }
}
```

Figures 5D, 5E:
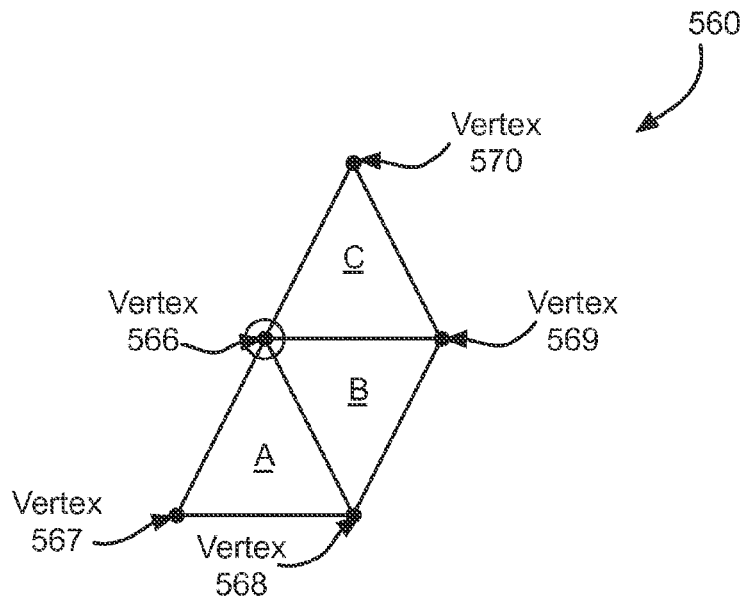
FIG. 5D shows shared vertices of primitives in a triangle fan, in accordance with one embodiment.
FIG. 5E shows attribute data that is shared for each vertex in FIG. 5D, in accordance with one embodiment.

FIG. 5D shows shared vertices of primitives in a triangle fan 560, in accordance with one embodiment. Primitive B and C are each defined by a shared vertex 567 and the shared vertex 567 is a provoking vertex for both primitive B and C. A primitive A is defined by a provoking vertex 566, a shared vertex 568 that is non-provoking, and the shared vertex 567 that is non-provoking.

A primitive B is defined by the shared vertex 567 that is provoking, the shared vertex 568 that is non-provoking, and a shared vertex 569 that is non-provoking. A primitive C is defined by the shared vertex 567 that is provoking, the shared vertex 569 that is non-provoking, and a vertex 570 that is non-provoking. When the viewport clip/cull unit 310 is configured to use the method 450 shown in FIG. 5C, a new instance of a shared vertex is created only when the shared vertex is a provoking vertex for two different primitives.

FIG. 5E shows attribute data that is shared for each vertex in FIG. 5D, in accordance with one embodiment. When the provoking vertex 566 is received, the viewport clip/cull unit 310 inserts the per-vertex attributes for the vertex 566 into the output stream for processing. Because vertex 566 is the provoking vertex, the viewport clip/cull unit 310 also inserts the per-primitive attributes for the primitive A into the output stream for processing. The provoking bit is set for the cache entry that stores the per-vertex attributes for vertex 566 and the per-primitive attributes for the primitive A.

When the non-provoking vertex 567 is received for primitive A, the viewport clip/cull unit 310 inserts the per-vertex attributes for the vertex 567 into the output stream. When the non-provoking vertex 568 is received for primitive A, the viewport clip/cull unit 310 inserts the per-vertex attributes for the vertex 568 into the output stream.

Primitive B follows primitive A in the input stream. When the provoking vertex 566 is received, the viewport clip/cull unit 310 determines that the vertex 566 is shared. In other words, there is a cache hit for the vertex 566. However, the viewport clip/cull unit 310 also recognizes that the shared vertex 566 is a provoking vertex for two different primitives because the provoking bit is set for the cache entry. The viewport clip/cull unit 310 then creates a new vertex for the shared vertex 566 by inserting the per-vertex attributes to the output stream and storing the per-vertex attributes for the shared vertex 566 in a separate cache entry from the entry that already stores the per-vertex attributes shared vertex 566 and the per-primitive attributes for the primitive A. Because vertex 566 is the provoking vertex, the viewport clip/cull unit 310 inserts the per-primitive attributes for the primitive B into the output stream. The provoking bit is set for the cache entry that stores the per-vertex attributes for the new provoking vertex created for the shared vertex 566 and the per-primitive attributes for the primitive B.

When the non-provoking vertex 568 is received for primitive B, the viewport clip/cull unit 310 determines that vertex 508 is a shared vertex and does not insert the per-vertex attributes for the vertex 568 into the output stream. When the non-provoking vertex 569 is received for primitive B, the viewport clip/cull unit 310 determines that vertex 568 is a new vertex (i.e., there is not a cache hit) and inserts the per-vertex attributes for the vertex 569 into the output stream.

Primitive C follows primitive B in the input stream. When the provoking vertex 566 is received, the viewport clip/cull unit 310 determines the vertex 566 is a shared vertex. In other words, there is at least one cache hit for the vertex 566. However, the viewport clip/cull unit 310 also recognizes that the shared vertex 566 is a provoking vertex for two different primitives because the provoking bit is set for both cache entries. The viewport clip/cull unit 310 then creates a new vertex for the shared vertex 566 by inserting the per-vertex attributes to the output stream and storing the per-vertex attributes for the shared vertex 566 in a separate cache entry from the other cache entries that already store the per-vertex attributes shared vertex 566 and the per-primitive attributes for either the primitive A or the primitive B. Because vertex 566 is the provoking vertex, the viewport clip/cull unit 310 inserts the per-primitive attributes for the primitive C into the output stream. The provoking bit is set for the cache entry that stores the per-vertex attributes for the new provoking vertex created for the shared vertex 566 and the per-primitive attributes for the primitive C.

When the non-provoking vertex 569 is received for primitive C, the viewport clip/cull unit 310 determines that vertex 569 is a shared vertex and does not insert the per-vertex attributes for the vertex 569 into the output stream. When the non-provoking vertex 570 is received for primitive C the viewport clip/cull unit 310 determines that vertex 570 is a new vertex (i.e., there is not a cache hit) and inserts the per-vertex attributes for the vertex 570 into the output stream.

A different technique may be used by the viewport clip/cull unit 310 to generate the output stream by looking ahead at vertices of primitives in the input stream. A number of subsequent primitives having vertices that are examined by the viewport clip/cull unit 310 may include the subsequent primitives that are within a look-ahead window having a finite size. In one embodiment, the viewport clip/cull unit 310 looks at the subsequent two primitives to identify any shared vertices. In particular, the viewport clip/cull unit 310 determines if a non-provoking vertex in the current primitive is a provoking vertex for one of the subsequent primitives in the look-ahead window. If so, then the per-vertex attributes and the per-primitive attributes that correspond to the subsequent primitive are inserted into the output stream to create a new vertex as the provoking vertex for the subsequent primitive. The provoking bit in the cache for the created provoking vertex is set. Also, the primitive index of the primitive for which the created vertex is a provoking vertex is stored in the cache. The primitive index is used when the subsequent primitive is received by the viewport clip/cull unit 310 during processing of the input stream.

When the subsequent primitive is processed by the viewport clip/cull unit 310, a cache hit occurs for the provoking vertex. Additionally, the provoking bit is set, indicating that the provoking vertex was already processed as a provoking vertex for a primitive. The primitive index indicates if the provoking vertex was already processed as a provoking vertex for the subsequent primitive, indicating that the per-primitive attributes for the subsequent primitive are stored with the per-vertex attributes for the provoking vertex. Therefore, the viewport clip/cull unit 310 does not create a new vertex as the provoking vertex and does not insert the per-vertex attributes and the per-primitive attributes into the output stream.

The look-ahead technique has the advantage of attempting to process per-vertex and per-primitive attributes at the same time, which can be beneficial to performance when the attributes are finely interleaved in the input stream, and can lead to more efficient traffic generated over the interfaces to/from the cache.

FIG. 6A shows shared vertices of primitives in a triangle strip as already shown in FIG. 5A, in accordance with one embodiment. FIG. 6B shows attribute data that is shared for each vertex in FIG. 6A, in accordance with another embodiment.

When the provoking vertex 506 is received, the viewport clip/cull unit 310 inserts the per-vertex attributes for the vertex 506 into the output stream. Because vertex 506 is the provoking vertex, the viewport clip/cull unit 310 also inserts the per-primitive attributes for the primitive A into the output stream. The provoking bit is set for the cache entry that stores the per-vertex attributes for vertex 506 and the per-primitive attributes for the primitive A. The primitive identifier for primitive A is also associated with the cache entry that stores the per-vertex attributes for vertex 506 and the per-primitive attributes for the primitive A.

When the non-provoking vertex 507 is received for primitive A, the viewport clip/cull unit 310 inserts the per-vertex attributes for the vertex 507 into the output stream. The viewport clip/cull unit 310 looks ahead to examine vertices of subsequent primitives that are in the look-ahead window. In one embodiment, the look-ahead window includes the vertices for at least two subsequent primitives. Because the vertex 507 is a shared vertex that is a provoking vertex for the primitive B, the viewport clip/cull unit 310 inserts the per-primitive attributes for the primitive B into the output stream. The provoking bit is set for the cache entry that stores the per-vertex attributes for vertex 507 and the per-primitive attributes for the primitive B. The primitive identifier for primitive B is also stored for the cache entry that stores the per-vertex attributes for vertex 507 and the per-primitive attributes for the primitive B.

When the non-provoking vertex 508 is received for primitive A, the viewport clip/cull unit 310 inserts the per-vertex attributes for the vertex 508 into the output stream. Because the vertex 508 is a shared vertex that is a provoking vertex for the primitive C, the viewport clip/cull unit 310 inserts the per-primitive attributes for the primitive C into the output stream. The provoking bit is set for the cache entry that stores the per-vertex attributes for vertex 508 and the per-primitive attributes for the primitive C. The primitive identifier for primitive C is also stored for the cache entry that stores the per-vertex attributes for vertex 508 and the per-primitive attributes for the primitive C.

Primitive B follows primitive A in the input stream. When the provoking vertex 507 is received, the viewport clip/cull unit 310 determines that the per-vertex attributes have already been output in the output stream and does not insert the per-vertex attributes for the vertex 507 into the output stream. In other words, vertex 507 is a shared vertex and there is a cache hit for the vertex 507. The viewport clip/cull unit 310 determines that the per-primitive attributes for the primitive B are stored in the cache because the primitive identifier is associated with the cache entry that stores the per-vertex attributes for vertex 507. Therefore, the viewport clip/cull unit 310 does not insert the per-primitive attributes for the primitive B into the output stream. Importantly, the per-vertex attributes for the vertex 507 are not duplicated or copied when the vertex 507 is received as a provoking vertex after being previously received as a non-provoking vertex. Also the per-primitive attributes for the primitive B are only inserted into the output stream once and/or stored in one cache entry.

When the non-provoking vertex 509 is received for primitive B, the viewport clip/cull unit 310 determines that vertex 509 is a new vertex (i.e., there is not a cache hit) and inserts the per-vertex attributes for the vertex 509 into the output stream. When the non-provoking vertex 508 is received for primitive B, the viewport clip/cull unit 310 determines that vertex 508 is a shared vertex and does not insert the per-vertex attributes for the vertex 508 into the output stream.

Primitive C follows primitive B in the input stream. When the provoking vertex 508 is received, the viewport clip/cull unit 310 determines the vertex 508 is a shared vertex and does not insert the per-vertex attributes for the vertex 508 into the output stream. In other words, there is a cache hit for the vertex 508. The viewport clip/cull unit 310 determines that the per-primitive attributes for the primitive C are stored in the cache because the primitive identifier is associated with the cache entry that stores the per-vertex attributes for vertex 508. Therefore, the viewport clip/cull unit 310 does not insert the per-primitive attributes for the primitive C into the output stream. The provoking bit is set for the cache entry that stores the per-vertex attributes for vertex 508 and the per-primitive attributes for the primitive C.

When the non-provoking vertex 509 is received for primitive C, the viewport clip/cull unit 310 determines that vertex 509 is a shared vertex and does not insert the per-vertex attributes for the vertex 509 into the output stream. When the non-provoking vertex 510 is received for primitive C the viewport clip/cull unit 310 determines that vertex 510 is a new vertex (i.e., there is not a cache hit) and inserts the per-vertex attributes for the vertex 510 into the output stream.

Figure 6C:
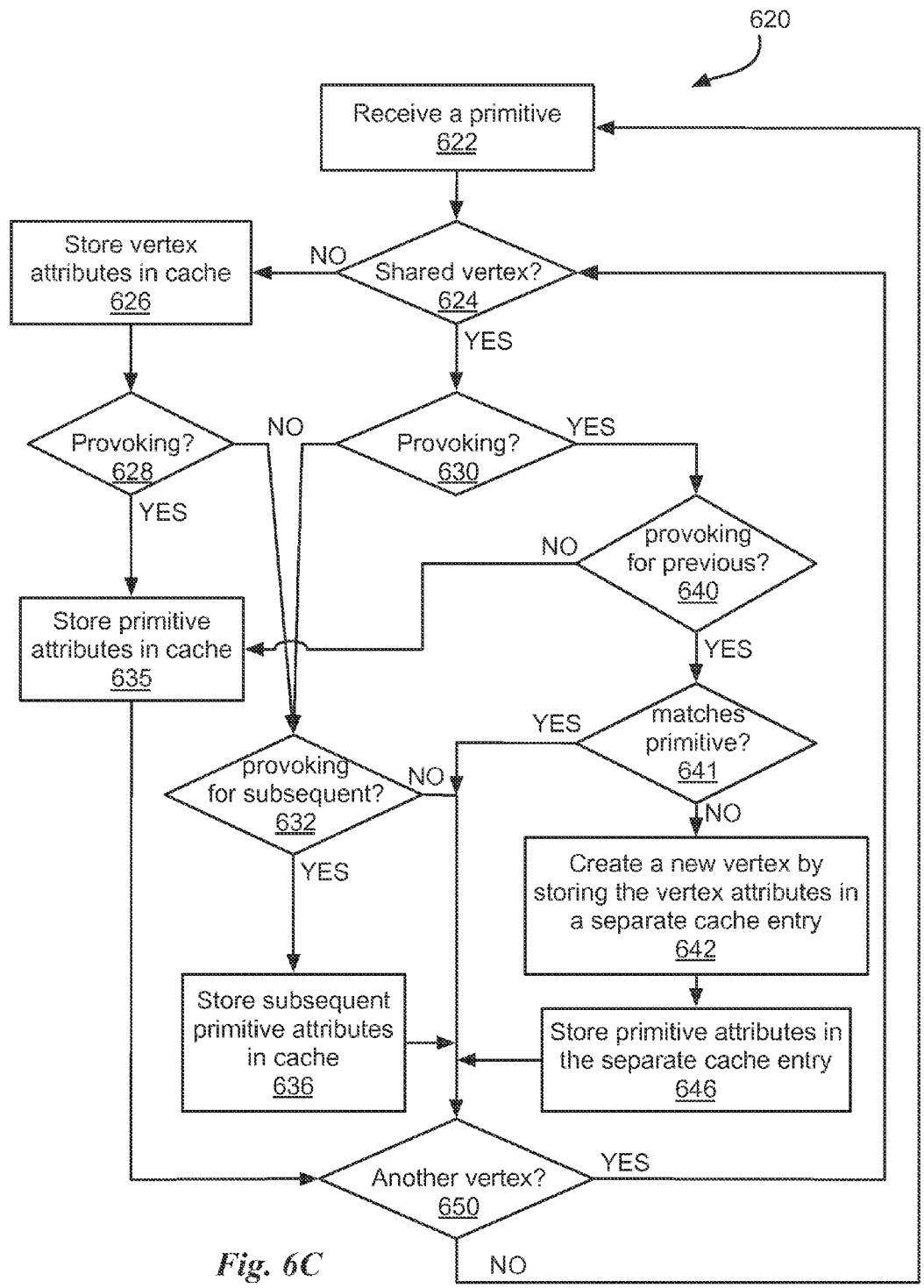
FIG. 6C shows a method for processing the shared vertices, in accordance with another embodiment.

FIG. 6C shows a method for processing the shared vertices using the look-ahead technique, in accordance with another embodiment. At step 622, the viewport clip/cull unit 310 receives a primitive. At step 624, the viewport clip/cull unit 310 determines if a vertex defining the primitive is a shared vertex. If, the vertex is shared, then, at step 630, the viewport clip/cull unit 310 determines if the shared vertex is a provoking vertex for the primitive. If the shared vertex is not a provoking vertex for the primitive, then the shared vertex is a non-provoking vertex and the viewport clip/cull unit 310 proceeds to step 632 and determines if the non-provoking vertex is a provoking vertex for a subsequent primitive by looking ahead in the input stream. If, at step 632, the vertex is a provoking vertex for a subsequent primitive, then, at step 636, the viewport clip/cull unit 310 stores the per-primitive attributes for the subsequent primitive in the cache entry with the shared vertex. The viewport clip/cull unit 310 also sets the provoking bit in the cache entry and stores the primitive identifier for the subsequent primitive before proceeding to step 650.

If, at step 630, the viewport clip/cull unit 310 determines that the shared vertex is a provoking vertex for the primitive, then, at step 640, the viewport clip/cull unit 310 determines if the shared vertex is also a provoking vertex for another primitive that was already processed. In one embodiment, the viewport clip/cull unit 310 determines that the shared vertex is a provoking vertex for a primitive that was already processed when the provoking flag associated with the cache entry is set. If, at step 640 the viewport clip/cull unit 310 determines that the shared vertex is not also a provoking vertex for a primitive that was already processed, then at step 635, the viewport clip/cull unit 310 stores the per-primitive attributes in the cache and the provoking flag associated with the cache entry is set. The viewport clip/cull unit 310 also sets the provoking bit in the cache entry and stores the primitive identifier for the primitive before proceeding to step 650. In one embodiment, the per-primitive attributes are stored in the same cache entry as the provoking vertex for the primitive. Importantly, each set of per-primitive attributes is only stored once and is only output by the viewport clip/cull unit 310 in the output stream once.

If, at step 640, the viewport clip/cull unit 310 determines that the shared vertex is a provoking vertex for a primitive that was already processed, then at step 641, the viewport clip/cull unit 310 determines if the primitive identifier associated with the cache entry is equal to (i.e., matches) the primitive identifier of the current primitive. Note that the primitive identifier will match when the shared vertex is identified as provoking using the look-ahead technique. In another embodiment, step 640 is omitted, and the "yes" path from step 630 goes directly to the step 641 and a new instance of the shared vertex is created when the look-ahead technique did not identify the vertex as being shared as a provoking vertex of a subsequent primitive.

If, at step 641, the primitive identifier associated with the cache entry matches the primitive identifier of the current primitive, then the viewport clip/cull unit 310 proceeds to step 650. Otherwise, at step 642, the viewport clip/cull unit 310 creates a new instance of the provoking vertex by storing the per-vertex attributes in a separate cache entry. When the shared vertex is shared as a provoking vertex for multiple primitives, the per-vertex attributes of the shared vertex are duplicated to generate an instance for each subsequent primitive. Therefore, the per-vertex attributes of the shared vertex may be duplicated more than once and stored in more than two cache entries. Only shared vertices that are also provoking vertices for two or more different primitives have per-vertex attributes that are duplicated and stored in separate cache entries. At step 646, the viewport clip/cull unit 310 stores the per-primitive attributes in the cache for each primitive for which the shared vertex is a provoking vertex, and the provoking flag associated with each cache entry is set before the viewport clip/cull unit 310 proceeds to step 650.

When the shared vertex is a provoking vertex for the current primitive and was a non-provoking vertex for a primitive that has already been processed (i.e., there was a cache hit at step 624), then the primitive identifier of the current primitive is associated with the cache entry. When the shared vertex is a provoking vertex only for a subsequent primitive (that has not yet been received and processed) that is within the look-ahead window, then the primitive identifier of the subsequent primitive is associated with the cache entry, as described further herein.

At step 650, the viewport clip/cull unit 310 determines if another vertex should be processed for the primitive. If another vertex should be processed, the viewport clip/cull unit 310 returns to step 624. Otherwise, the viewport clip/cull unit 310 returns to step 622.

If, at step 624 the viewport clip/cull unit 310 determines that a vertex defining the primitive is not a shared vertex, the vertex is a new vertex and, at step 626, the viewport clip/cull unit 310 stores the new vertex in the cache. At step 628, the viewport clip/cull unit 310 determines if the new vertex is a provoking vertex for the primitive, and, if not, the viewport clip/cull unit 310 proceeds to step 632, as previously described.

If, at step 628, the viewport clip/cull unit 310 determines that the shared vertex is a provoking vertex for the primitive, then the viewport clip/cull unit 310 proceeds to step 635 and stores the per-primitive attributes in the cache entry and the provoking flag associated with the cache entry is set. The viewport clip/cull unit 310 also sets the provoking bit in the cache entry and stores the primitive identifier for the primitive before proceeding to step 650.

If, at step 640, the viewport clip/cull unit 310 determines that the shared vertex is a provoking vertex for a primitive that has already been processed, then, the viewport clip/cull unit 310 proceeds to step 642, as previously described. The shared vertex may be a provoking vertex that was not within a look-ahead window when the previous primitive sharing the provoking vertex was received.

The algorithm performed by the viewport clip/cull unit 310 reduces duplication, processing, and storing of the per-vertex attributes compared with the algorithm shown in FIG. 4B that duplicates all shared vertices. In sum, when a vertex is first seen as a non-provoking vertex, the per-vertex attributes are processed. Vertices within a look-ahead window are examined to determine if the non-provoking vertex is a provoking vertex for a subsequent primitive, and, if so the per-primitive attributes of the subsequent primitive are also processed and stored in the same cache entry. Because the vertex is marked as having been processed (by setting the provoking bit) and the primitive identifier is stored, neither the per-vertex attributes nor the per-primitive attributes are processed again when the subsequent primitive is received.

When a vertex is first seen as a provoking vertex, both the per-vertex attributes and the per-primitive attributes are processed. However, because the vertex is marked as having been processed (by setting the provoking bit), the per-vertex attributes are not processed again if the vertex is seen as a non-provoking vertex. If another primitive is defined by the same provoking vertex, then a new vertex instance is created and stored in a new cache entry.

Figures 6D, 6E:
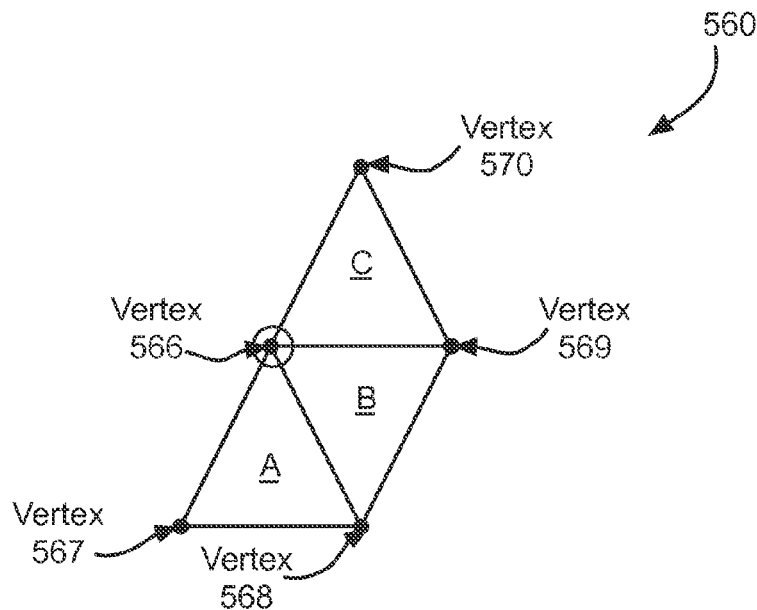
FIG. 6D shows shared vertices of primitives in a triangle fan, in accordance with one embodiment.
FIG. 6E shows attribute data that is shared for each vertex in FIG. 6D, in accordance with another embodiment.

FIG. 6D shows shared vertices of primitives in the triangle fan of FIG. 5D, in accordance with one embodiment. FIG. 6E shows attribute data that is shared for each vertex in FIG. 6D, in accordance with another embodiment. When the provoking vertex 566 is received, the viewport clip/cull unit 310 inserts the per-vertex attributes for the vertex 566 into the output stream for processing. Because vertex 566 is the provoking vertex, the viewport clip/cull unit 310 also inserts the per-primitive attributes for the primitive A into the output stream for processing. The provoking bit is set for the cache entry that stores the per-vertex attributes for vertex 566 and the per-primitive attributes for the primitive A. The primitive identifier of primitive A is associated with the cache entry. In one embodiment, the primitive identifier of primitive A is stored in the cache entry.

In one embodiment, the viewport clip/cull unit 310 does not looks ahead to examine vertices of subsequent primitives that are in the look-ahead window when the current vertex is a provoking vertex.

When the non-provoking vertex 567 is received for primitive A, the viewport clip/cull unit 310 inserts the per-vertex attributes for the vertex 567 into the output stream. When the non-provoking vertex 568 is received for primitive A, the viewport clip/cull unit 310 inserts the per-vertex attributes for the vertex 568 into the output stream.

Primitive B follows primitive A in the input stream. When the provoking vertex 566 is received, the viewport clip/cull unit 310 determines that the per-vertex attributes have already been output in the output stream. In other words, vertex 566 is a shared vertex and there is a cache hit for the vertex 566. However, the provoking bit is set for the cache entry storing the per-vertex attributes. Therefore, the viewport clip/cull unit 310 checks if the primitive identifier associated with the hit cache entry matches the identifier of primitive B to confirm that the cache entry is associated with the primitive B. The viewport clip/cull unit 310 determines that the cache entry is not associated with the primitive B because the vertex 566 is a shared vertex that is also a provoking vertex for the previous primitive A. Therefore, the viewport clip/cull unit 310 creates a new instance of the shared vertex 566 by duplicating the per-primitive attributes for the shared vertex 566 and inserting the per-vertex attributes for the vertex 566 into the output stream again.

The duplicated per-vertex attributes for the vertex 566 are stored in separate cache entries than the per-vertex attributes for the vertex 566 that were previously inserted into the output stream for the primitive A. The viewport clip/cull unit 310 then inserts the per-primitive attributes for the primitive B into the output stream. The provoking bit is set for the cache entry that stores the duplicated per-vertex attributes for vertex 566 and the per-primitive attributes for the primitive B. The primitive identifier for primitive B is also stored for the cache entry that stores the duplicated per-vertex attributes for vertex 566 and the per-primitive attributes for the primitive B.

When the non-provoking vertex 568 is received for primitive B, the viewport clip/cull unit 310 determines that vertex 508 is a shared vertex and does not insert the per-vertex attributes for the vertex 568 into the output stream. When the non-provoking vertex 569 is received for primitive B, the viewport clip/cull unit 310 determines that vertex 568 is a new vertex (i.e., there is not a cache hit) and inserts the per-vertex attributes for the vertex 569 into the output stream.

Primitive C follows primitive B in the input stream. When the provoking vertex 566 is received, the viewport clip/cull unit 310 determines the vertex 566 is a shared vertex. However, the provoking bit is set for the cache entries storing the per-vertex attributes. Therefore, the viewport clip/cull unit 310 checks if the primitive identifier associated with one of the hit cache entries matches the identifier of primitive C to confirm that a cache entry is associated with the primitive C. The viewport clip/cull unit 310 determines that neither cache entry is associated with the primitive C because the vertex 566 is a shared vertex that is also a provoking vertex for previous primitives A and B. Therefore, the viewport clip/cull unit 310 creates a new instance of the shared vertex 566 by duplicating the per-primitive attributes for the shared vertex 566 and inserting the per-vertex attributes for the vertex 566 into the output stream again. The duplicated per-vertex attributes for the vertex 566 are stored in a separate cache entry than the per-vertex attributes for the vertex 566 that were previously inserted into the output stream for the primitives A and B. The viewport clip/cull unit 310 then inserts the per-primitive attribute for primitive C into the output stream. The provoking bit is set for the cache entry that stores the duplicated per-vertex attributes for vertex 566 and the per-primitive attributes for the primitive C. The primitive identifier for primitive C is also stored for the cache entry that stores the duplicated per-vertex attributes for vertex 566 and the per-primitive attributes for the primitive C.

When the non-provoking vertex 569 is received for primitive C, the viewport clip/cull unit 310 determines that vertex 569 is a shared vertex and does not insert the per-vertex attributes for the vertex 569 into the output stream. When the non-provoking vertex 570 is received for primitive C the viewport clip/cull unit 310 determines that vertex 570 is a new vertex (i.e., there is not a cache hit) and inserts the per-vertex attributes for the vertex 570 into the output stream.

Figure 7A:
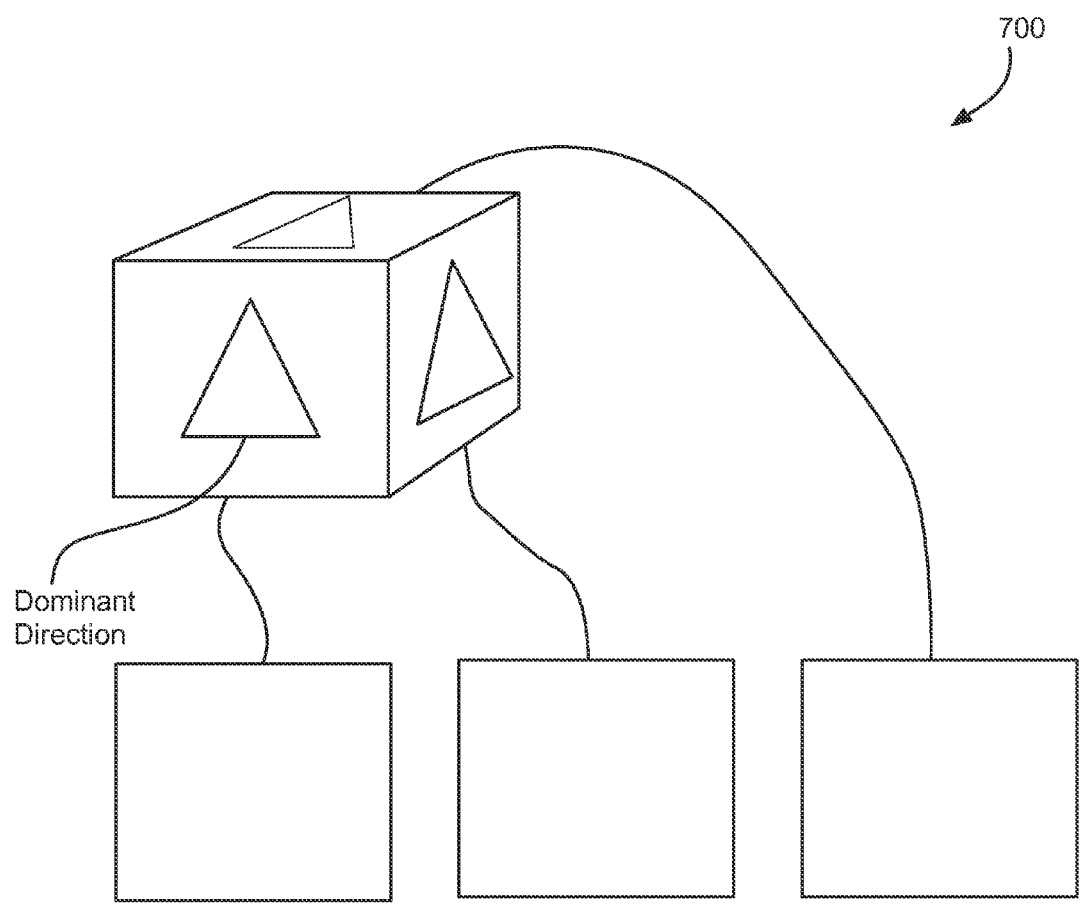
FIG. 7A shows an illustration of a voxelization implementation, in accordance with one embodiment.

FIG. 7A shows an illustration of a voxelization implementation 700, in accordance with one embodiment. As an option, the illustration 700 may be viewed in the context of the previous Figures and/or any subsequent Figure(s). Of course, however, the illustration 700 may be viewed in the context of any desired environment. It should also be noted that the aforementioned definitions may apply during the present description.

In the context of the present description, voxelization refers to the synthesis of voxel-represented objects. A voxel refers to any volume element representing a value on a regular grid in three-dimensional space. In one embodiment, a unit in a graphics processing pipeline (e.g. a geometry shader, etc.) may identify a dominant direction of a primitive and may project the primitive to corresponding three-dimensional volume. In one embodiment, the dominant direction may be determined by determining a normal associated with a primitive. In one embodiment, the primitive may be projected in a multicast manner.

Figure 7B:
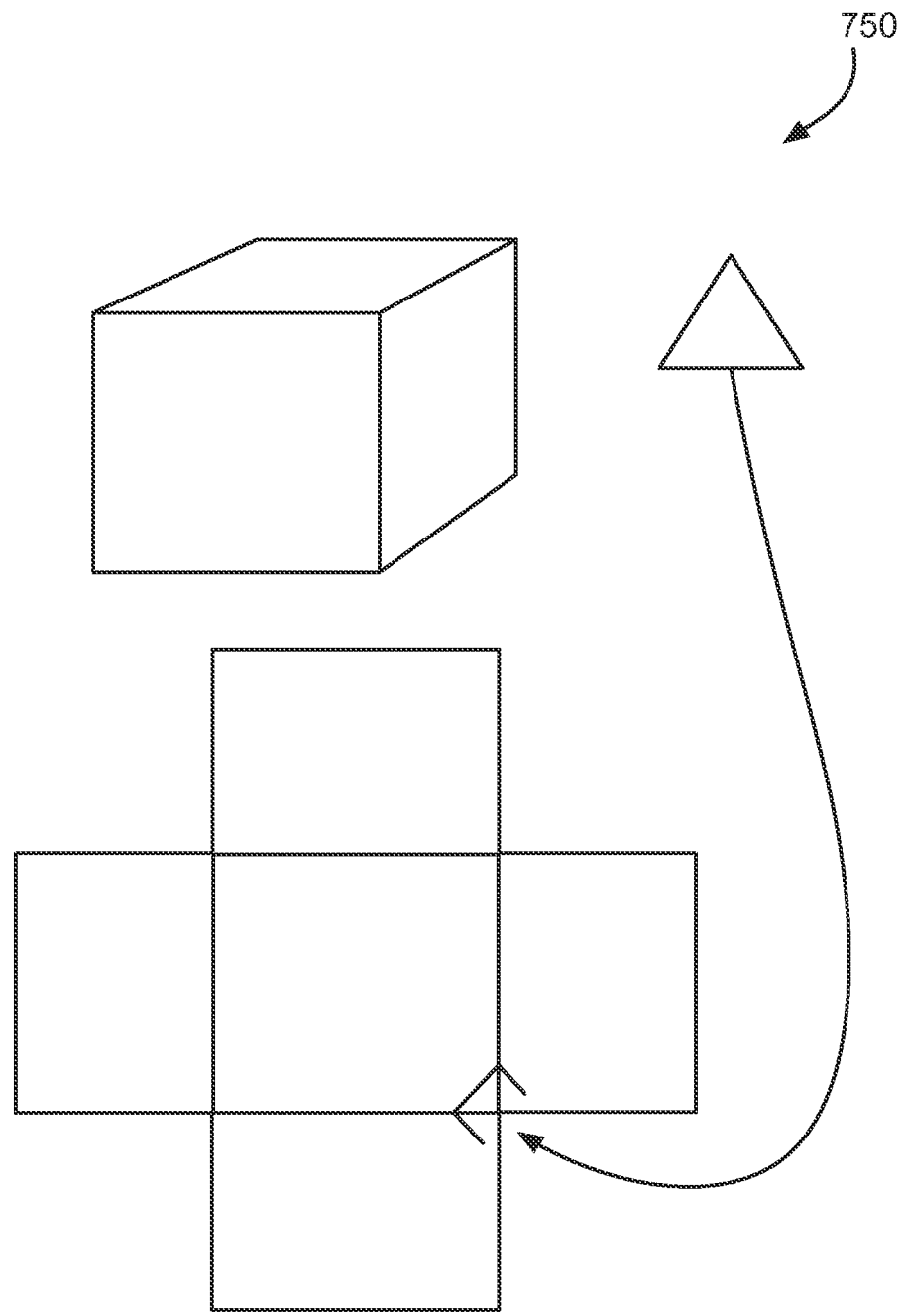
FIG. 7B shows an illustration of a cube mapping implementation, in accordance with one embodiment.

FIG. 7B shows an illustration of a cube mapping implementation 750, in accordance with one embodiment. As an option, the illustration 750 may be viewed in the context of the previous Figures and/or any subsequent Figure(s). Of course, however, the illustration 750 may be viewed in the context of any desired environment. It should also be noted that the aforementioned definitions may apply during the present description.

In the context of the present description, cube mapping refers to any technique of environment mapping that uses a cube as the map shape, where the environment is projected onto six faces of a cube and stored as six square textures, or unfolded into six regions of a single texture. In one embodiment, a unit in a graphics processing pipeline (e.g. a geometry shader, etc.) may identify faces of the cube map to which a primitive projects. Further, in one embodiment, a multi-projection aspect of the graphics processing pipeline may be utilized to project the primitive to each of the identified faces, utilizing the techniques described herein.

Figure 8:
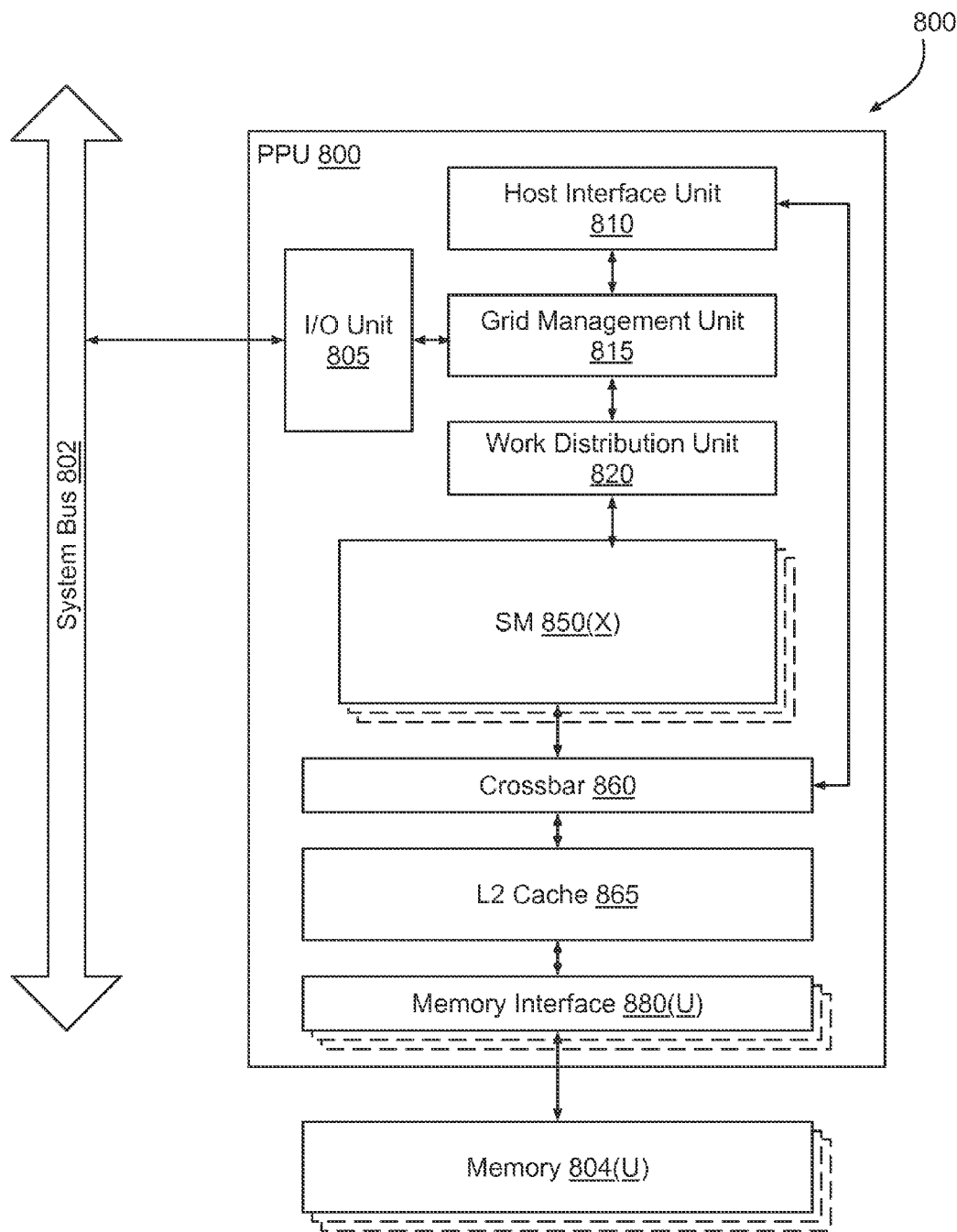
FIG. 8 illustrates a parallel processing unit, in accordance with one embodiment.

FIG. 8 illustrates a parallel processing unit (PPU) 800, in accordance with one embodiment. As an option, the PPU 800 may be implemented in the context of the functionality and architecture of the previous Figures and/or any subsequent Figure(s). Of course, however, the PPU 800 may be implemented in any desired environment. It should also be noted that the aforementioned definitions may apply during the present description.

While a parallel processor is provided herein as an example of the PPU 800, it should be strongly noted that such processor is set forth for illustrative purposes only, and any processor may be employed to supplement and/or substitute for the same. In one embodiment, the PPU 800 is configured to execute a plurality of threads concurrently in two or more streaming multi-processors (SMs) 850. A thread (i.e. a thread of execution) is an instantiation of a set of instructions executing within a particular SM 850. Each SM 850, described below in more detail in conjunction with FIG. 9, may include, but is not limited to, one or more processing cores, one or more load/store units (LSUs), a level-one (L1) cache, shared memory, and the like.

In one embodiment, the PPU 800 includes an input/output (I/O) unit 805 configured to transmit and receive communications (i.e., commands, data, etc.) from a central processing unit (CPU) (not shown) over the system bus 802. The I/O unit 805 may implement a Peripheral Component Interconnect Express (PCIe) interface for communications over a PCIe bus. In alternative embodiments, the I/O unit 805 may implement other types of well-known bus interfaces.

The PPU 800 also includes a host interface unit 810 that decodes the commands and transmits the commands to the grid management unit 815 or other units of the PPU 800 (e.g. a memory interface 880, etc.) as the commands may specify. The host interface unit 810 is configured to route communications between and among the various logical units of the PPU 800.

In one embodiment, a program encoded as a command stream is written to a buffer by the CPU. The buffer is a region in memory, e.g., memory 804 or system memory, that is accessible (i.e., read/write) by both the CPU and the PPU 800. The CPU writes the command stream to the buffer and then transmits a pointer to the start of the command stream to the PPU 800. The host interface unit 810 provides the grid management unit (GMU) 815 with pointers to one or more streams. The GMU 815 selects one or more streams and is configured to organize the selected streams as a pool of pending grids. The pool of pending grids may include new grids that have not yet been selected for execution and grids that have been partially executed and have been suspended.

A work distribution unit 820 that is coupled between the GMU 815 and the SMs 850 manages a pool of active grids, selecting and dispatching active grids for execution by the SMs 850. Pending grids are transferred to the active grid pool by the GMU 815 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 820. In addition to receiving grids from the host interface unit 810 and the work distribution unit 820, the GMU 810 also receives grids that are dynamically generated by the SMs 850 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 800. An application may include instructions (i.e. API calls, etc.) that cause the driver kernel to generate one or more grids for execution. In one embodiment, the PPU 800 implements a SIMD (Single-Instruction, Multiple-Data) architecture where each thread block (i.e. warp, etc.) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 800 comprises X SMs 850(X). For example, the PPU 800 may include 15 distinct SMs 850. Each SM 850 is multi-threaded and configured to execute a plurality of threads (e.g., 32 threads) from a particular thread block concurrently. Each of the SMs 850 is connected to a level-two (L2) cache 865 via a crossbar 860 (or other type of interconnect network). The L2 cache 865 is connected to one or more memory interfaces 880. Memory interfaces 880 implement 16, 32, 64, 128-bit data buses, or the like, for high-speed data transfer. In one embodiment, the PPU 800 comprises U memory interfaces 880(U), where each memory interface 880(U) is connected to a corresponding memory device 804(U). For example, PPU 800 may be connected to up to 6 memory devices 804, such as graphics double-data-rate, version 5, synchronous dynamic random access memory (GDDR5 SDRAM).

In one embodiment, the PPU 800 implements a multi-level memory hierarchy. The memory 804 is located off-chip in SDRAM coupled to the PPU 800. Data from the memory 804 may be fetched and stored in the L2 cache 865, which is located on-chip and is shared between the various SMs 850. In one embodiment, each of the SMs 850 also implements an L1 cache. The L1 cache is private memory that is dedicated to a particular SM 850. Each of the L1 caches is coupled to the shared L2 cache 865. Data from the L2 cache 865 may be fetched and stored in each of the L1 caches for processing in the functional units of the SMs 850.

In one embodiment, the PPU 800 comprises a graphics processing unit (GPU). The PPU 800 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g. in a model-space coordinate system, etc.) as well as attributes associated with each vertex of the primitive. The PPU 800 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the GMU 815 may configure one or more SMs 850 to execute a vertex shader program that processes a number of vertices defined by the model data. In one embodiment, the GMU 815 may configure different SMs 850 to execute different shader programs concurrently. For example, a first subset of SMs 850 may be configured to execute a vertex shader program while a second subset of SMs 850 may be configured to execute a pixel shader program. The first subset of SMs 850 processes vertex data to produce processed vertex data and writes the processed vertex data to the L2 cache 865 and/or the memory 804. After the processed vertex data is rasterized (i.e., transformed from three-dimensional data into two-dimensional data in screen space) to produce fragment data, the second subset of SMs 850 executes a pixel shader to produce processed fragment data, which is then blended with other processed fragment data and written to the frame buffer in memory 804. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 800 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 800 is embodied on a single semiconductor substrate. In another embodiment, the PPU 800 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 800 may be included on a graphics card that includes one or more memory devices 804 such as GDDR5 SDRAM. The graphics card may be configured to interface with a PCIe slot on a motherboard of a desktop computer that includes, e.g., a northbridge chipset and a southbridge chipset. In yet another embodiment, the PPU 800 may be an integrated graphics processing unit (iGPU) included in the chipset (i.e., Northbridge) of the motherboard.

Figure 9:
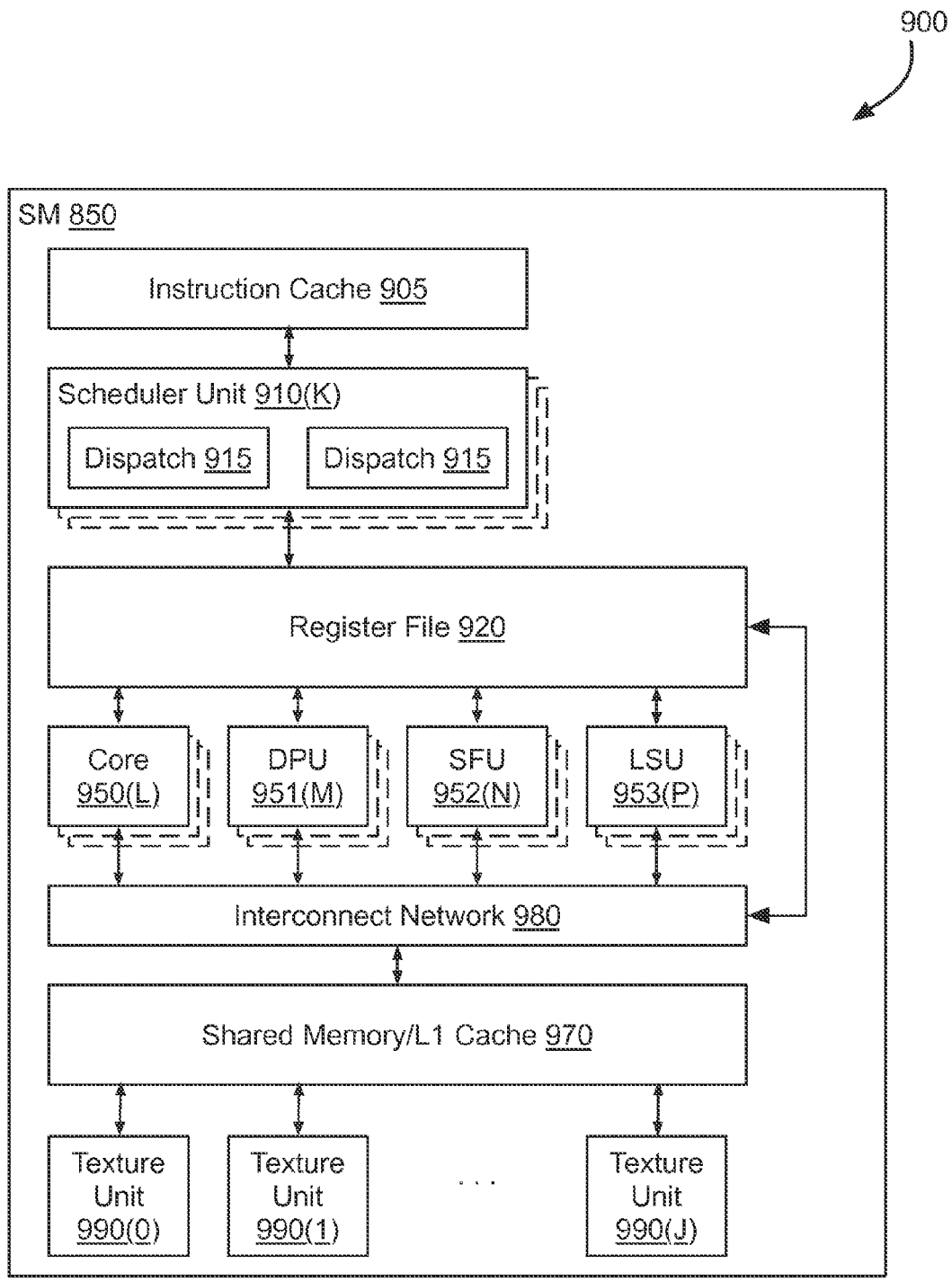
FIG. 9 illustrates the streaming multi-processor of FIG. 8, in accordance with one embodiment.

FIG. 9 illustrates the streaming multi-processor 850 of FIG. 8, in accordance with one embodiment. As shown in FIG. 9, the SM 850 includes an instruction cache 905, one or more scheduler units 910, a register file 920, one or more processing cores 950, one or more double precision units (DPUs) 951, one or more special function units (SFUs) 952, one or more load/store units (LSUs) 953, an interconnect network 980, a shared memory/L1 cache 970, and one or more texture units 990.

As described above, the work distribution unit 820 dispatches active grids for execution on one or more SMs 850 of the PPU 800. The scheduler unit 910 receives the grids from the work distribution unit 820 and manages instruction scheduling for one or more thread blocks of each active grid. The scheduler unit 910 schedules threads for execution in groups of parallel threads, where each group is called a warp. In one embodiment, each warp includes 32 threads. The scheduler unit 910 may manage a plurality of different thread blocks, allocating the thread blocks to warps for execution and then scheduling instructions from the plurality of different warps on the various functional units (i.e., cores 950, DPUs 951, SFUs 952, and LSUs 953) during each clock cycle.

In one embodiment, each scheduler unit 910 includes one or more instruction dispatch units 915. Each dispatch unit 915 is configured to transmit instructions to one or more of the functional units. In the embodiment shown in FIG. 9, the scheduler unit 910 includes two dispatch units 915 that enable two different instructions from the same warp to be dispatched during each clock cycle. In alternative embodiments, each scheduler unit 910 may include a single dispatch unit 915 or additional dispatch units 915.

Each SM 850 includes a register file 920 that provides a set of registers for the functional units of the SM 850. In one embodiment, the register file 920 is divided between each of the functional units such that each functional unit is allocated a dedicated portion of the register file 920. In another embodiment, the register file 920 is divided between the different warps being executed by the SM 850. The register file 920 provides temporary storage for operands connected to the data paths of the functional units.

Each SM 850 comprises L processing cores 950. In one embodiment, the SM 850 includes a large number (e.g., 192, etc.) of distinct processing cores 950. Each core 950 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 850 also comprises M DPUs 951 that implement double-precision floating point arithmetic, N SFUs 952 that perform special functions (e.g., copy rectangle, pixel blending operations, and the like), and P LSUs 953 that implement load and store operations between the shared memory/L1 cache 970 and the register file 920. In one embodiment, the SM 850 includes 64 DPUs 951, 32 SFUs 952, and 32 LSUs 953.

Each SM 850 includes an interconnect network 980 that connects each of the functional units to the register file 920 and the shared memory/L1 cache 970. In one embodiment, the interconnect network 980 is a crossbar that can be configured to connect any of the functional units to any of the registers in the register file 920 or the memory locations in shared memory/L1 cache 970.

In one embodiment, the SM 850 is implemented within a GPU. In such an embodiment, the SM 850 comprises J texture units 990. The texture units 990 are configured to load texture maps (i.e., a 2D array of texels) from the memory 804 and sample the texture maps to produce sampled texture values for use in shader programs. The texture units 990 implement texture operations such as anti-aliasing operations using mip-maps (i.e., texture maps of varying levels of detail). In one embodiment, the SM 850 includes 16 texture units 990.

The PPU 800 described above may be configured to perform highly parallel computations much faster than conventional CPUs. Parallel computing has advantages in graphics processing, data compression, biometrics, stream processing algorithms, and the like.

Figure 10:
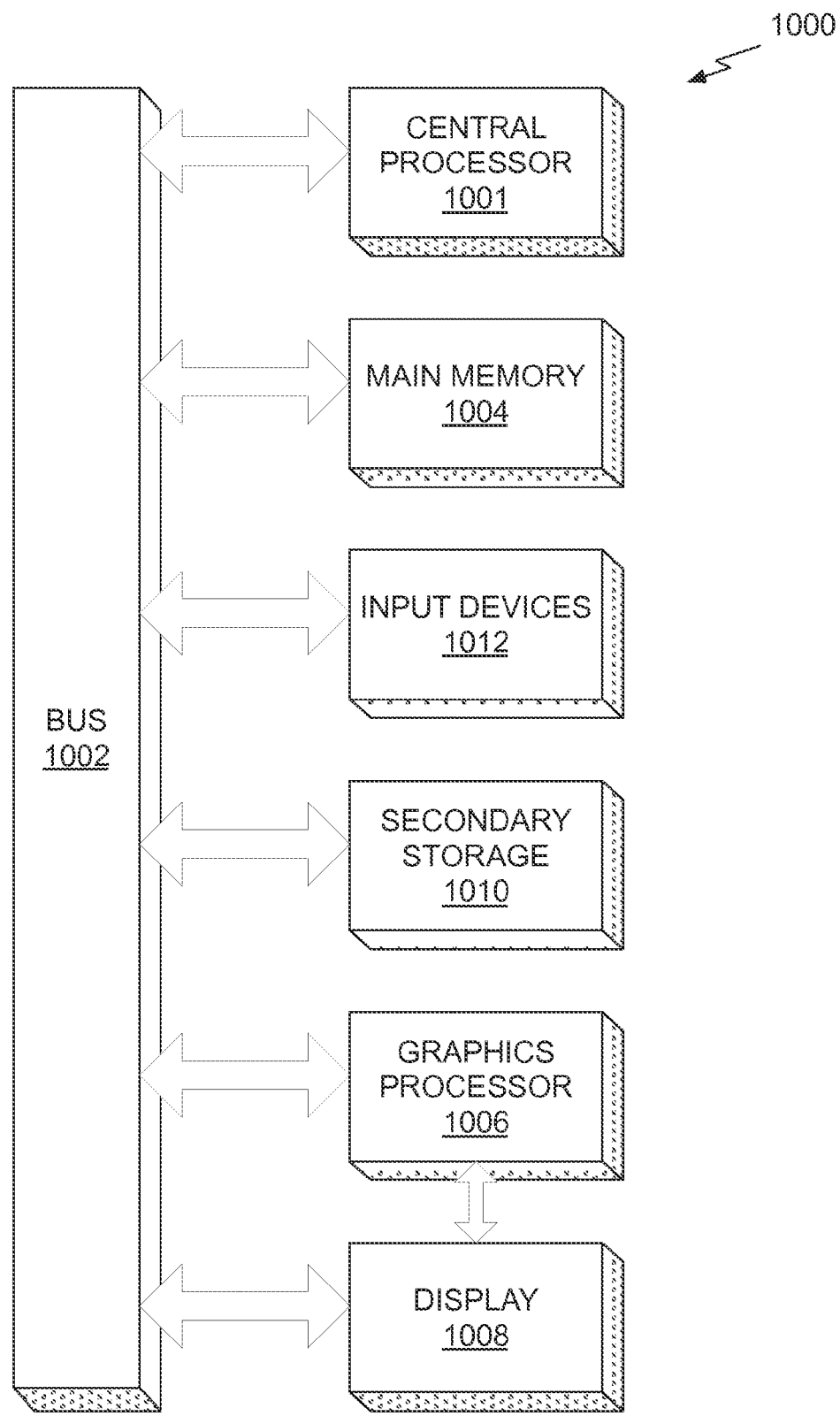
FIG. 10 illustrates an exemplary system in which the various architecture and/or functionality of the various previous embodiments may be implemented.

FIG. 10 illustrates an exemplary system 1000 in which the various architecture and/or functionality of the various previous embodiments may be implemented. As shown, a system 1000 is provided including at least one central processor 1001 that is connected to a communication bus 1002. The communication bus 1002 may be implemented using any suitable protocol, such as PCI (Peripheral Component Interconnect), PCI-Express, AGP (Accelerated Graphics Port), HyperTransport, or any other bus or point-to-point communication protocol(s). The system 1000 also includes a main memory 1004. Control logic (software) and data are stored in the main memory 1004 which may take the form of random access memory (RAM).

The system 1000 also includes input devices 1012, a graphics processor 1006, and a display 1008, i.e. a conventional CRT (cathode ray tube), LCD (liquid crystal display), LED (light emitting diode), plasma display or the like. User input may be received from the input devices 1012, e.g., keyboard, mouse, touchpad, microphone, and the like. In one embodiment, the graphics processor 1006 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1000 may also include a secondary storage 1010. The secondary storage 1010 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 1004 and/or the secondary storage 1010. Such computer programs, when executed, enable the system 1000 to perform various functions. The main memory 1004, the storage 1010, and/or any other storage are possible examples of computer-readable media.

In one embodiment, the architecture and/or functionality of the various previous figures may be implemented in the context of the central processor 1001, the graphics processor 1006, an integrated circuit (not shown) that is capable of at least a portion of the capabilities of both the central processor 1001 and the graphics processor 1006, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1000 may take the form of a desktop computer, laptop computer, server, workstation, game consoles, embedded system, and/or any other type of logic. Still yet, the system 1000 may take the form of various other devices including, but not limited to a personal digital assistant (PDA) device, a mobile phone device, a television, etc.

Further, while not shown, the system 1000 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    determining that a portion of a graphics processor is operating in a fast geometry shader mode, wherein the graphics processor comprises at least one streaming multiprocessor configured to execute a vertex shader and a geometry shader;
    determining that a first vertex associated with a first set of per-vertex attributes is a first shared vertex;
    determining that the first shared vertex is a non-provoking vertex corresponding to a first primitive that is associated with a first set of per-primitive attributes;
    determining that the first shared vertex is a provoking vertex corresponding to a second primitive that is associated with a second set of per-primitive attributes by examining vertices of the second primitive and vertices of a third primitive when the first primitive is received;
    storing the first set of the per-vertex attributes associated with the first shared vertex; and
    storing only one copy of the second set of per-primitive attributes associated with the second primitive.

2. The method of claim 1, further comprising processing the only one copy of the second set of per-primitive attributes associated with the second primitive.

3. The method of claim 1, wherein the first set of the per-vertex attributes associated with the first shared vertex is stored in a cache entry.

4. The method of claim 3, wherein the only one copy of the second set of per-primitive attributes associated with the second primitive is also stored in the cache entry.

5. The method of claim 3, further comprising setting a bit corresponding to the cache entry indicating that the first shared vertex is the provoking vertex.

6. The method of claim 3, further comprising associating a primitive identifier corresponding to the second primitive with the cache entry.

7. The method of claim 1, further comprising:
    determining that a second vertex associated with a second set of per-vertex attributes is a second shared vertex;
    determining that the second shared vertex is the provoking vertex corresponding to the first primitive and a third primitive that is associated with a third set of per-primitive attributes; and
    duplicating the second set of per-vertex attributes associated with the second shared vertex to generate a duplicated set of per-vertex attributes associated with the second shared vertex.

8. The method of claim 7, further comprising:
    storing the second set of per-vertex attributes and the first set of per-primitive attributes associated with the first primitive in a first cache entry; and
    storing the duplicated set of per-vertex attributes and the third set of per-primitive attributes associated with the third primitive in a second cache entry.

9. A non-transitory computer readable medium, storing instructions that, when executed by a processor, cause the processor to perform steps, comprising:
    determining that a portion of a graphics processor is operating in a fast geometry shader mode, wherein the graphics processor comprises at least one streaming multiprocessor configured to execute a vertex shader and a geometry shader;
    determining that a first vertex associated with a first set of per-vertex attributes is a first shared vertex;
    determining that the first shared vertex is a non-provoking vertex corresponding to a first primitive that is associated with a first set of per-primitive attributes;
    determining that the first shared vertex is a provoking vertex corresponding to a second primitive that is associated with a second set of per-primitive attributes by examining vertices of the second primitive and vertices of a third primitive when the first primitive is received;
    storing the first set of the per-vertex attributes associated with the first shared vertex; and
    storing only one copy of the second set of per-primitive attributes associated with the second primitive.

10. A system, comprising:
    a graphics processor comprising at least one streaming multiprocessor configured to execute a vertex shader and a geometry shader, and configured to:
    determine that a portion of a graphics processor is operating in a fast geometry shader mode;
    determine that a first vertex associated with a first set of per-vertex attributes is a first shared vertex;
    determine that the first shared vertex is a non-provoking vertex corresponding to a first primitive that is associated with a first set of per-primitive attributes;
    determine that the first shared vertex is a provoking vertex corresponding to a second primitive that is associated with a second set of per-primitive attributes by examining vertices of the second primitive and vertices of a third primitive when the first primitive is received;
    store the first set of the per-vertex attributes associated with the first shared vertex; and
    store only one copy of the second set of per-primitive attributes associated with the second primitive.

11. The system of claim 10, wherein the graphics processor comprises a cache and the first set of the per-vertex attributes associated with the first shared vertex is stored in a cache entry.

12. The system of claim 11, wherein the only one copy of the second set of per-primitive attributes associated with the second primitive is also stored in the cache entry.

13. The system of claim 11, wherein the graphics processor is further configured to set a bit corresponding to the cache entry indicating that the first shared vertex is the provoking vertex.

14. A method, comprising:
- determining that a portion of a graphics processor is operating in a fast geometry shader mode, wherein the graphics processor comprises at least one streaming multiprocessor configured to execute a vertex shader and a geometry shader;
- determining that a first vertex associated with a first set of per-vertex attributes is a first shared vertex;
- determining that the first shared vertex is a non-provoking vertex corresponding to a first primitive that is associated with a first set of per-primitive attributes;
- determining that the first shared vertex is a provoking vertex corresponding to a second primitive that is associated with a second set of per-primitive attributes;
- determining that a second vertex associated with a second set of per-vertex attributes is a second shared vertex;
- determining that the second shared vertex is the provoking vertex corresponding to the first primitive;
- duplicating the second set of per-vertex attributes associated with the second shared vertex to generate a duplicated set of per-vertex attributes associated with the second shared vertex;
- storing the first set of the per-vertex attributes associated with the first shared vertex; and
- storing only one copy of the second set of per-primitive attributes associated with the second primitive.

15. The method of claim 14, wherein the first set of the per-vertex attributes associated with the first shared vertex is stored in a cache entry.

* * * * *